(12) United States Patent
Loechner

(10) Patent No.: US 7,233,745 B2
(45) Date of Patent: Jun. 19, 2007

(54) FIELD DEVICE CONFIGURED FOR WIRELESS DATA COMMUNICATION

(75) Inventor: Michael Loechner, Filderstadt (DE)

(73) Assignee: Invensys Systems, Inc., Foxboro, MA (US)

( * ) Notice: Subject to any disclaimer, the term of this patent is extended or adjusted under 35 U.S.C. 154(b) by 693 days.

(21) Appl. No.: 09/983,890

(22) Filed: Oct. 26, 2001

(65) Prior Publication Data

US 2002/0065631 A1 May 30, 2002

(30) Foreign Application Priority Data

Oct. 27, 2000 (EP) .................................. 00123340

(51) Int. Cl.
*H04B 10/00* (2006.01)
*H04B 1/04* (2006.01)
*H04Q 7/00* (2006.01)

(52) U.S. Cl. .................... 398/128; 398/120; 455/127.1; 340/539.1

(58) Field of Classification Search ............. 340/539.1, 340/555–557, 636.1; 455/343.1, 41.2, 66.1, 455/127.1, 127.5, 522; 375/238, 353, 239, 375/259; 370/310, 349; 398/120, 128
See application file for complete search history.

(56) References Cited

U.S. PATENT DOCUMENTS

| 3,699,445 | A  | * | 10/1972 | Kinsel ........................ 398/187 |
| 5,214,526 | A  | * | 5/1993  | Tonomura .................... 398/189 |
| 5,781,125 | A  |   | 7/1998  | Godau et al. |
| 5,793,963 | A  | * | 8/1998  | Tapperson et al. .......... 709/201 |
| 6,028,540 | A  | * | 2/2000  | Graham ........................ 341/72 |
| 6,574,452 | B1 | * | 6/2003  | Morvan et al. ............. 455/11.1 |
| 6,775,323 | B1 | * | 8/2004  | Vasudevan Pillai et al. 375/238 |
| 7,027,773 | B1 | * | 4/2006  | McMillin .................... 455/41.2 |
| 2003/0142656 | A1 | * | 7/2003 | Padovani et al. ........... 370/347 |

FOREIGN PATENT DOCUMENTS

| WO | WO93/22713 | 11/1993 |
| WO | WO96/12993 | 5/1996 |
| WO | WO98/20408 | 5/1998 |

* cited by examiner

*Primary Examiner*—Jason Chan
*Assistant Examiner*—Quan-Zhen Wang
(74) *Attorney, Agent, or Firm*—Fish & Richardson P.C.

(57) ABSTRACT

Field devices comprising a transmitter and/or receiver for wireless data communication are provided. It is proposed to evaluate the energy available for wireless data communication in data transmitting or data receiving field devices prior to activation of the transmitter and/or receiver of the field device.

53 Claims, 20 Drawing Sheets

UART FRAME

IR FRAME

FIELD DEVICE CONFIGURED FOR WIRELESS DATA COMMUNICATION

TECHNICAL FIELD

The present invention relates to a field device for monitoring a manufacturing process and actuating manufacturing process variables, and being configured for wireless data communication.

BACKGROUND

Field devices as described in the following are generally used in a manufacturing process to monitor the process and to actuate process variables. Typically, actuators are placed in the manufacturing field to drive different process control elements, such as valves or sensors. Further, transmitters are installed in the manufacturing field to monitor process variables, such as fluid pressure, fluid temperature or fluid flow.

Actuators and transmitters are coupled to a control bus to receive process information and transmit the process information to a centralized system controller that monitors the overall operation of the manufacturing process. This control bus may be implemented as a two wire current loop carrying current that provides power supply for operation of a field device.

In such control systems, communication is typically executed through a fieldbus standard, which is a digital communication standard that permits transmitters to be coupled to only a single control bus to transmit sensed process variables to the central controller. Examples of communication standards include ISA 50.02-1992 Section 11, HART®, Foundation Field Bus, Profibus Pa., and FoxCom. HART® overlays digital communication on a 4 to 20 mA process variable signal.

An important aspect with respect to control systems of the type outlined above is intrinsic safety. When a field device is located in a hazardous area without explosion proof equipment, the electronics in the field device should be intrinsically safe, which means that the electronics must be designed so that no sparks and no heat are generated thereby even when one or more electronic component failures occur at the same time.

Usually intrinsic safety is achieved by employing additional protective elements to protect the electronics under a failure condition. Design specifications and certifications for the protective elements vary with the specific type of application. For example, they may vary with the type of explosive gas used within a manufacturing process.

FIG. 1 shows a schematic diagram of a manufacturing process control system. As shown in FIG. 1, the peripheral part of the control system may comprise a first intrinsically safe fieldbus segment 10 and a second bus segment using, e.g., the RS485 standard for data communication. The intrinsically safe fieldbus segment 10 and the RS485 bus segment 12 are coupled through a bus coupler 14. Further, the side of the intrinsically safe fieldbus segment 10 not being attached to the bus coupler 14 is connected to a terminating circuit 16 that helps to avoid reflections on the intrinsically safe fieldbus segment 10.

As also shown in FIG. 1, to each bus segment 10, 12 there is connected at least one field device 18, 20 and 22. Each field device is either an actuator, a transmitter or another I/O device receiving and/or transmitting information.

The field devices attached to the intrinsically safe fieldbus segment 10 may be powered through an electric current received from the intrinsically safe fieldbus segment 10 leading to a voltage drop across the field devices 20, 22. Typically, the intrinsically safe fieldbus segment 10 will be operated under a fieldbus protocol or any other appropriate protocol allowing to exchange digital information.

As shown in FIG. 1, the field devices 20, 22 coupled to the intrinsically safe fieldbus segment 10 exchange information through modification of the current flowing into each single field device 20, 22. For digital communication, a basic value of the current of the intrinsically safe fieldbus segment 10 is modulated to be increased or decreased by a predetermined offset value, i.e. 9 mA for the fieldbus standard. This modulation of the current flowing into either the field device 20 or the field device 22 leads to a modification of a voltage UB on the intrinsically safe fieldbus segment 10 thus achieving digital communication.

FIG. 2 shows a more detailed schematic circuit diagram of a field device shown in FIG. 1. As shown in FIG. 2, the intrinsically safe fieldbus segment 10 may be summarized into an equivalent circuit diagram with an ideal voltage source 24 and a resistor 26 to model AC voltage impedance and to fulfill intrinsic safety requirements for spark protection, current limitation and power limitation in a hazardous area. As also shown in FIG. 2, each field device is connected to the intrinsically safe fieldbus segment with two lines 28, 30 being also connected to a discharge protection unit 32. At the output of the discharge protection unit 32 there is provided a modulating unit 34 which allows modulation of the operating current flowing into the field device.

The modulating unit 34 is connected in series to a power converter unit 36 that is adapted to map the operating current flowing over the modulating unit 34 into a suitable power supply signal for a control unit 38 connected to the output of the power conversion unit 36. The control unit 38 is connected to an actuator and/or sensor unit 40 for the control thereof.

Operatively, the controller unit 38 controls the operating current modulating unit 34 to achieve a modulation of the operating current and therefore exchange information between the intrinsically safe fieldbus segment 10 and the field device. Further, the control unit 38 has control over the further elements in the field device.

Operatively, each field device 20, 22 connected to the intrinsically safe fieldbus segment 10 receives an operating current from the intrinsically safe fieldbus segment 10. During transfer of information from the field device to the intrinsically safe fieldbus segment 10, the current value for the operating current is determined by the modulating unit 34 under control of the control unit 38. Further, to receive information at the field device, the controller unit 40 maintains the resistance of the modulating unit 34 at a constant value. When a different field device triggers a change of the voltage on the intrinsically safe fieldbus segment 10, the remaining field device(s) connected to this intrinsically safe fieldbus segment 10 may detect this change of a voltage through the connection lines 28, 30 for further processing thereof in the control unit 38. This digital communication mechanism is used to provide the controller unit 40 in each field device both with control information for activation of actuators and/or sensors during manufacturing process control and surveillance of the field device itself.

It becomes clear that explosion protection in a hazardous area and shortage of energy supply are currently the major constraints for the operation of field devices. Therefore, different approaches to ignition protection in hazardous areas exist, e.g., an explosion intrinsically safe fieldbus, passive achievement of intrinsically safety through related design of electronics to avoid overheating and increased currents/voltages, or active implementation of intrinsic safety using active electronic devices such as electronic limiters. For reasons of explosion protection, if the electronics of a field device are not intrinsic safe, encapsulation into mechanically stable housings and sealed conduits and pipes for electric cables are required to achieve explosion protection, independent from the electronic design. To support both protection systems with one type of device, intrinsicly safe electronic and explosion proof mechanical design must be combined in one field device.

In conclusion, the exchange of information and the access to sensors in the field device is severely limited both from a mechanical but also from an electrical point of view and only limited transfer rates are achievable.

In other words, higher transfer rates in a two wire implementation would normally lead to an unacceptable current consumption in view of available power supply all through the control bus. These restrictions are becoming even more severe in view of the fact that control buses and current loops will be operative with even more reduced currents—e.g., as low as 3.6 mA.

SUMMARY

In one general aspect, a field device includes at least one actuator and/or sensor adapted to alter and/or sense a control and/or process variable in a manufacturing field, a transmitter and/or a receiver configured to provide wireless data communication, and a controller. The controller is configured to evaluate the energy available in the field device for wireless data communication prior to activation of the transmitter and/or receiver.

These and other aspects permit an increase in the data exchange capabilities of field devices without sacrificing intrinsic safety. In particular, wireless data communication may substitute or supplement wirebound communication in a manufacturing field (where a constraint is reduced power supply) through the use of appropriate power management. In particular, the wireless data exchange may be easily combined with the data exchange over a control bus so as to increase the overall bandwidth for communication in each field device.

Using wireless data transmission directed to the field device, an increase in bandwidth may be achieved without any increase in installation expenditure as no additional wiring is required in the manufacturing field. Further, wireless communication does not require the matching to specific impedances for the exchange of communication signals, thus avoiding the consideration of impedances and spark protection at system input and/or output terminals to achieve intrinsic safety according to the usual technology.

The adaptation of wireless data transmission for field devices through appropriate power management allows field devices to be operated exclusively through wireless communication using a configurator. This promises to avoid potential problems with respect to the intrinsic safety and also to decrease the associated costs.

When using wireless data transmission alone, the problem of an intrinsically safe coupling of the control bus in the manufacturing field is eliminated. Here, it is important to note that the energy necessary for wireless data communication will never reach a level sufficient to ignite an explosive gas mixture. Yet another decisive advantage of wireless data communication is that electrical contacts of the field devices do not need to be exposed.

In some implementations, the exchange of data using wireless communication from and/or to the device may be delayed in the event that an energy shortage in the field device would lead to an unsafe data transfer. The delay time may be used to supply further energy to the field device before activation of the transmitter and/or receiver. This permits guaranteed safe exchange of data from and/or to the field device. Since data communication only starts when enough energy is available in the field device, any interruption of a data exchange after initiation thereof and therefore any loss of energy in the field device due to uncompleted data exchange processes may be strictly avoided.

The data stream to be transmitted and/or received through wireless data communication may be split into separate data segments. Through this technique, unnecessary delays during the data transmission and/or reception may be avoided. In other words, since less energy is necessary for smaller data packages or data segments, the transfer and/or reception thereof may be initiated when only a small amount of energy is available in the field device. Overall, this leads to an acceleration of the wireless data transmission and/or reception.

The transmitter and/or receiver may be of the infrared type and may include a coder unit adapted to receive an input bit stream and to code each input bit such that a related, generated coded pulse has a pulse time period shorter than the bit pulse time period. This approach to power consumption reduction is not restricted to a particular coding scheme. In other words, either a logical 1-bit or a logical 0-bit may be coded into a narrower coded pulse while the logical 0-bit or 1-bit is not coded into a pulse at all. Also, transitions between different bit pulse amplitudes 1, 0 may be coded into pulses for subsequent output thereof. Coded pulses may have different widths or frequencies for indication of either one of two states, i.e., logical 1, 0 or a transition therebetween. The techniques may also be adapted to the IrDA Standard published by the Infrared Data Association Organization as a standard for serial infrared data exchange.

The described techniques allow for an interoperable, low-cost, low-power, half duplex serial data interconnection standard to be applied within manufacturing fields to produce, retrieve, present and transmit control information and sensor and/or actuator-related information.

This new approach to a cost efficient cordless user interface in the manufacturing field, in particular the IrDA Standard, also enables the integration of personal digital assistance with PDA, desktop and notebook computers as configurators or remote device in such manufacturing plants. These available standard components therefore reduce the overall costs of system implementation. Further standards to be applied within the framework of the described techniques are the serial infrared link SIR, the link access protocol IrLAP and the link management protocol IrLMP to extend the bandwidth to up to 4.0 Mbit/s. Further, the techniques are well adapted to future extensions of low power transmission standards as long as the infrared transmission requires only a relatively small power supply.

However, it should be noted that the described techniques are not restricted to infrared transmission of data alone. To the contrary, wireless data communication may also be achieved in the radio, visible light or ultrasonic frequency range to replace cable connecting portable and/or fixed field devices.

The transmitter may include a transmitting unit (either for infrared visible light, ultrasonic or radio frequency) connected between a power supply line and ground and an energy buffer coupled across the light emitting unit for supply of energy thereto. This accounts for the reduced availability of power within the field device. In other words, when the transmitting unit is not emitting waveforms, energy available on the power supply line may be pre-stored in the energy buffer (e.g., a capacitor) for subsequent use during the transmission process. This is particularly useful when the power supply line does not supply sufficient energy to the transmitting unit during transmission so that the energy buffer backs up the power supply.

The transmitter may further include a first resistor and a second resistor connected in series between the power supply line and the transmission unit. The energy buffer is connected to the node between the first resistor and the second resistor and the second resistor is variable to change, e.g., the irradiance of a light-emitting unit used for wireless transmission or the output power of a radio frequency transmitter. The first resistor serves to limit the amount of energy or the maximum current flowing into the energy buffer and the second resistor allows for adaptation of the transmission range, e.g., according to available energy within the field device or according to a desired data exchange distance. Therefore, the field device may be used together with the remote configurator such that different data exchange distances may be specified for different operative conditions. One example would be that in a hazardous environment an operator may not approach the field device beyond a predetermined limited distance while in other environments he may closely approach the field device to reduce the amount of power consumed during data exchange.

The techniques described above may be implemented in a manufacturing plant control system that includes at least one functional unit coupled to a central controller by a system bus, and at least one control bus coupling at least one field device to the functional unit. The at least one field device includes a transmitter and/or receiver adapted to communicate using wireless data communication with a remote device, and a controller adapted to evaluate the energy available in the field device for wireless data communication prior to activation of the transmitter and/or receiver.

Wireless data communication may be used to configure, interrogate, calibrate or test field devices without touching them, and to substitute wireless communication links for the control bus. In other words, when all communication is achieved in a wireless manner, one can implement the control system for the manufacturing process without any wiring in the manufacturing field at all or through a combined form of communication links, i.e., through the control bus and wireless infrared communication links.

Different field devices or functional units of the manufacturing plant control system may each have a transmitter linked through a remote access data exchange network. The provision of a remote access data exchange network allows for remote data exchange in a very efficient manner. In another variation, only a single field device or functional unit has a wireless data communication capability and is used as an access point or portal for access to various components in the manufacturing field that are connected to the same control loop as the field device serving as portal. The application of the portal concept to a manufacturing field allows a reduction in the effort and expense necessary to achieve wireless data communication.

In another general aspect, exchanging data in a manufacturing field using wireless data communication includes evaluating the energy available for wireless data communication in a data transmitting or data receiving field device prior to activation of a transmitter and/or receiver of the field device. This allows the advantages outlined above to be achieved. Also, input data may be divided into data segments with an idle time in between. Therefore, the transmitting and/or receiving field device may be supplied with further power for subsequent wireless data transmission during each idle time.

Yet another important advantage of the segmentation of the input data stream into smaller data segments is that prior to the transmission and/or reception of each data segment it is possible to check on the available energy for data exchange. When the energy available within the field device is insufficient for the requested data exchange, the data exchange may be delayed until enough energy is available. This allows avoidance of data loss or an incomplete and therefore faulty data exchange in the manufacturing plant control system which might possibly lead to failures.

The energy available in the field device for wireless data communication (e.g., a voltage of a buffer capacitor) may be monitored and the wireless data exchange may be stopped when the energy supply is no longer sufficient. This allows the exchange of data using wireless communication as long as energy is available in the field device.

A computer program product directly loaded into the internal memory of a field device controller may include software code portions for use in exchanging data in a manufacturing field using wireless data transmission when the computer program product is run on the field device controller. Such an implementation leads to the provision of computer program products for use within a computer system or more specifically a processor comprised in, e.g., a controller of a transmitter and/or receiver.

Programs defining the method functions can be delivered to a controller in many forms, including but not limited to information permanently stored on non-writable storage media, e.g., read only memory devices such as ROM or CD ROM discs readable by processors or computer I/O attachments; further information stored on writable storage media, i.e., floppy discs and hard drives; or information conveyed to a controller through communication medias such as network and/or telephone network and/or Internet through modems or other interface devices. It should be understood that such media, when carrying processor and/or controller readable instructions represent alternate implementations.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
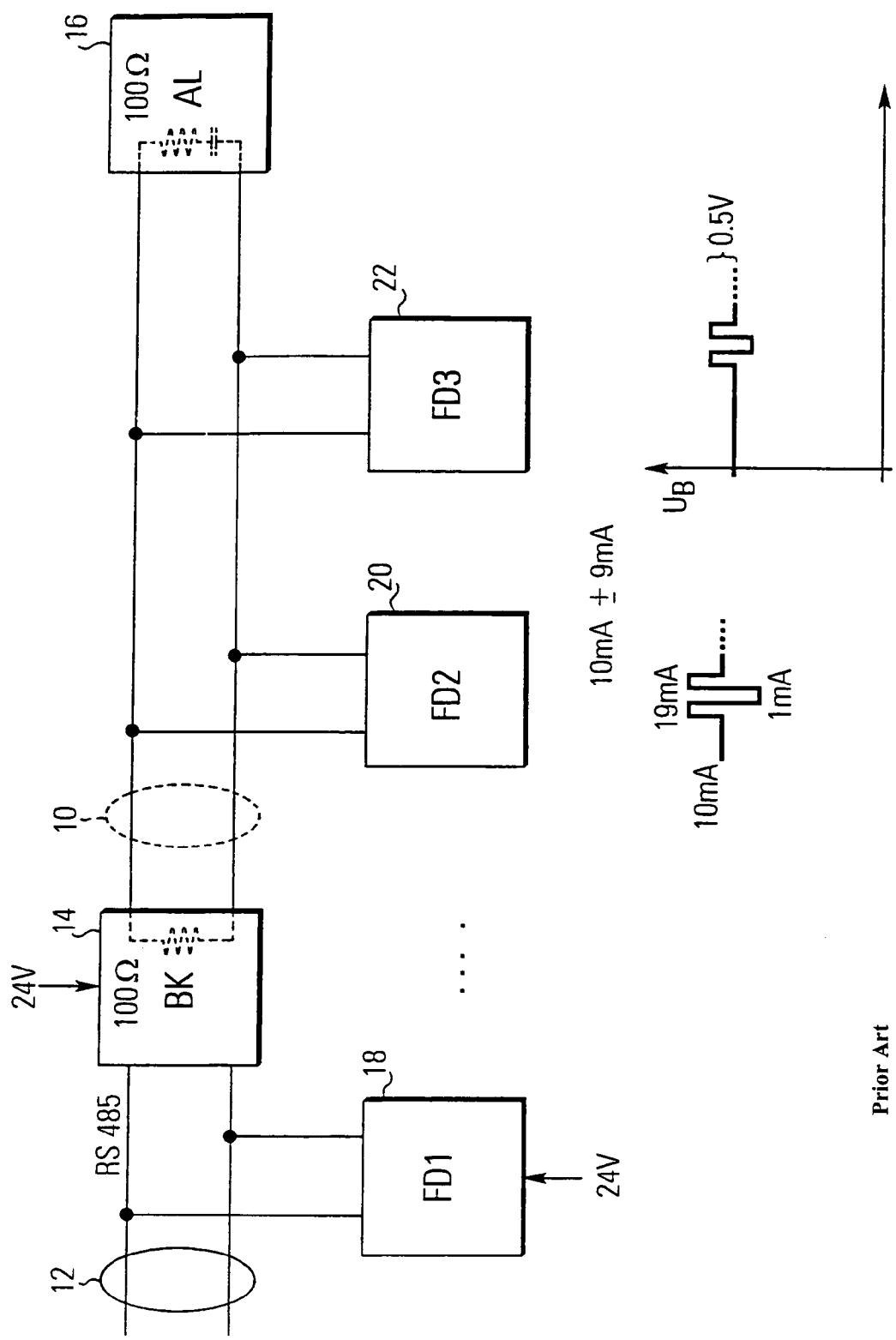
FIG. 1 shows a peripheral part of a manufacturing process control system.
Figure 2:
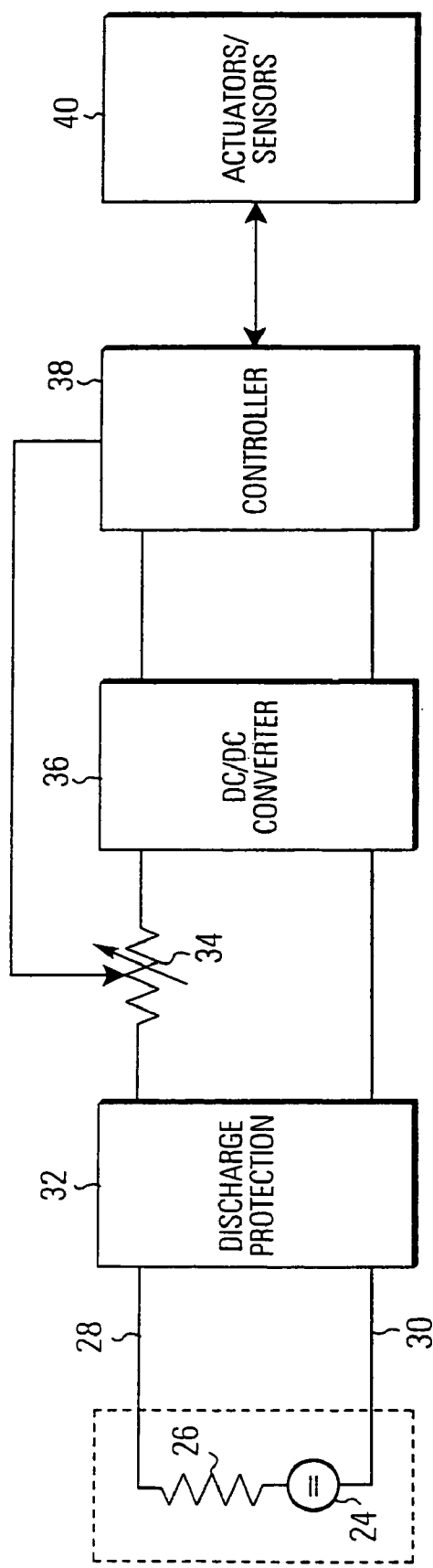
FIG. 2 shows a more detailed schematic diagram of the field devices shown in FIG. 1.
Figure 3:
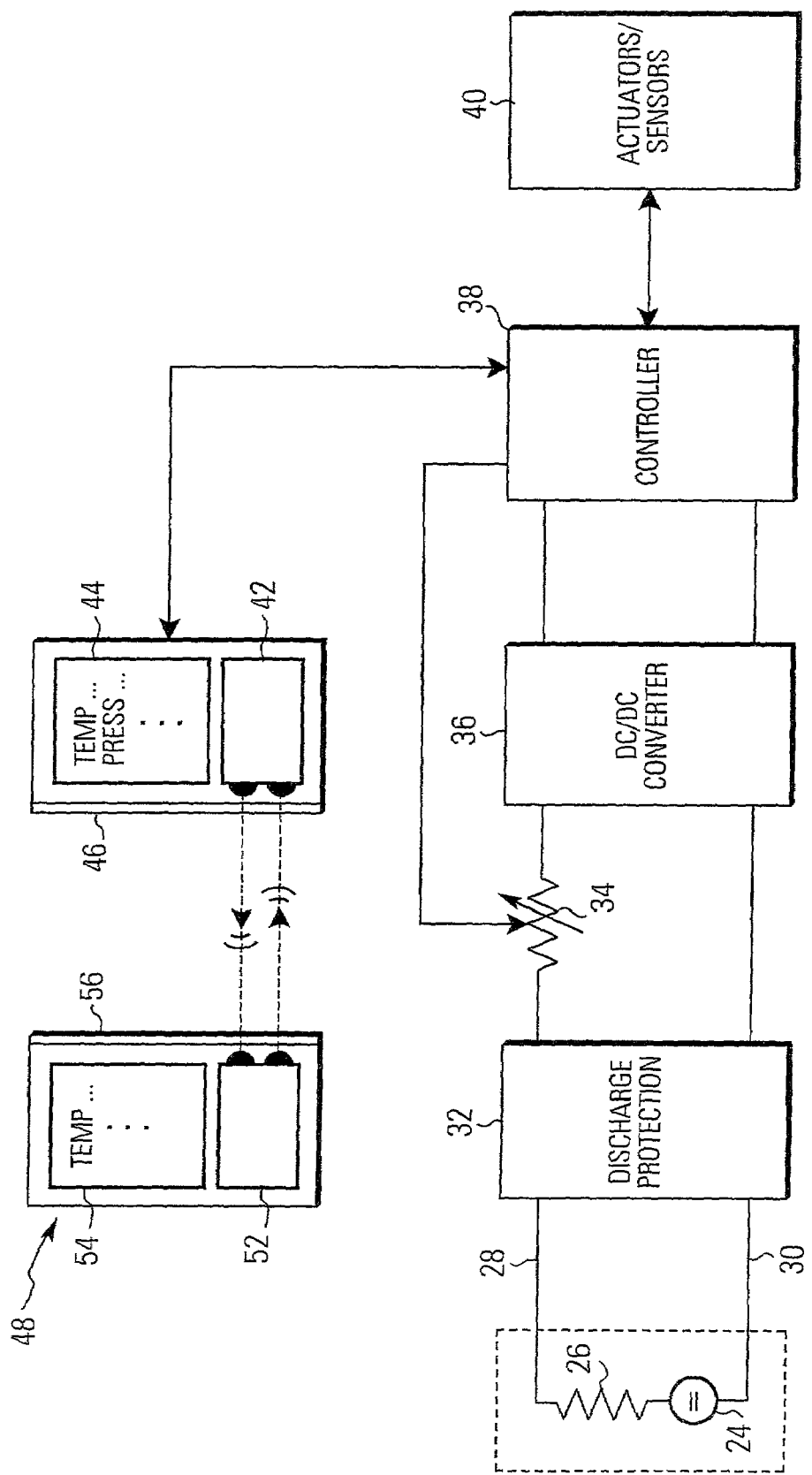
FIG. 3 shows a schematic diagram of a field.

FIG. 3 shows a schematic diagram of a field device. Those elements having the same reference numeral as corresponding or related elements shown in FIG. 2 will not be explained in detail in the following, but reference is made to the explanation of FIG. 2 as outlined above.

As shown in FIG. 3, the field device differs over previously known field devices in that it comprises a transmitter and/or receiver 42 for wireless data communication. Further, there is provided a display unit 44, e.g., a LCD device, for display of measurement of control data to the user of the field device. The transmitter and/or receiver 42 and the display unit 44 are arranged behind a transparent window 46 provided in the housing of the field device.

As also shown in FIG. 3, the field device may communicate with the remote device 48 having as well a transmitter and/or receiver 52 for wireless data communication and a display unit 54 arranged behind a transparent window 56. This remote device may be used, e.g., for interrogation, configuration, calibration and testing of the field device. The display units display measured or transferred variables as well as menus and fully descriptive messages. Further, self-consisting menus allow rapid execution of testing steps. The remote device may be a laptop computer, a hand-held PC, a PDA assistance, a mobile telephone or any other appropriate portable communication unit adapted to wireless data communication. Standard devices may be used instead of specifically designed hardware to reduce overall system costs in comparison to wirebound communication.

Further, dependent upon the application it might be necessary that the remote device is either intrinsically safe or explosion proof or both. Here, intrinsic safety is easier to achieve than explosion proofness as in the latter case the operating elements must be provided in an explosion proof remote device housing. However, one feature is that the remote device as such must not be wired with the field device thus avoiding an explosion proof encapsulation of electrical contacts.

As shown in FIG. 3, operatively the transmitter and/or receiver 42 and the display unit 44 are operated under control of the controller unit 38 of the field device. The energy necessary for the operation of the transmitter and/or receiver 42 and the display device 44 is supplied externally via the control bus, the discharge protection unit 32, and the DC/DC converter 36.

Figure 4:
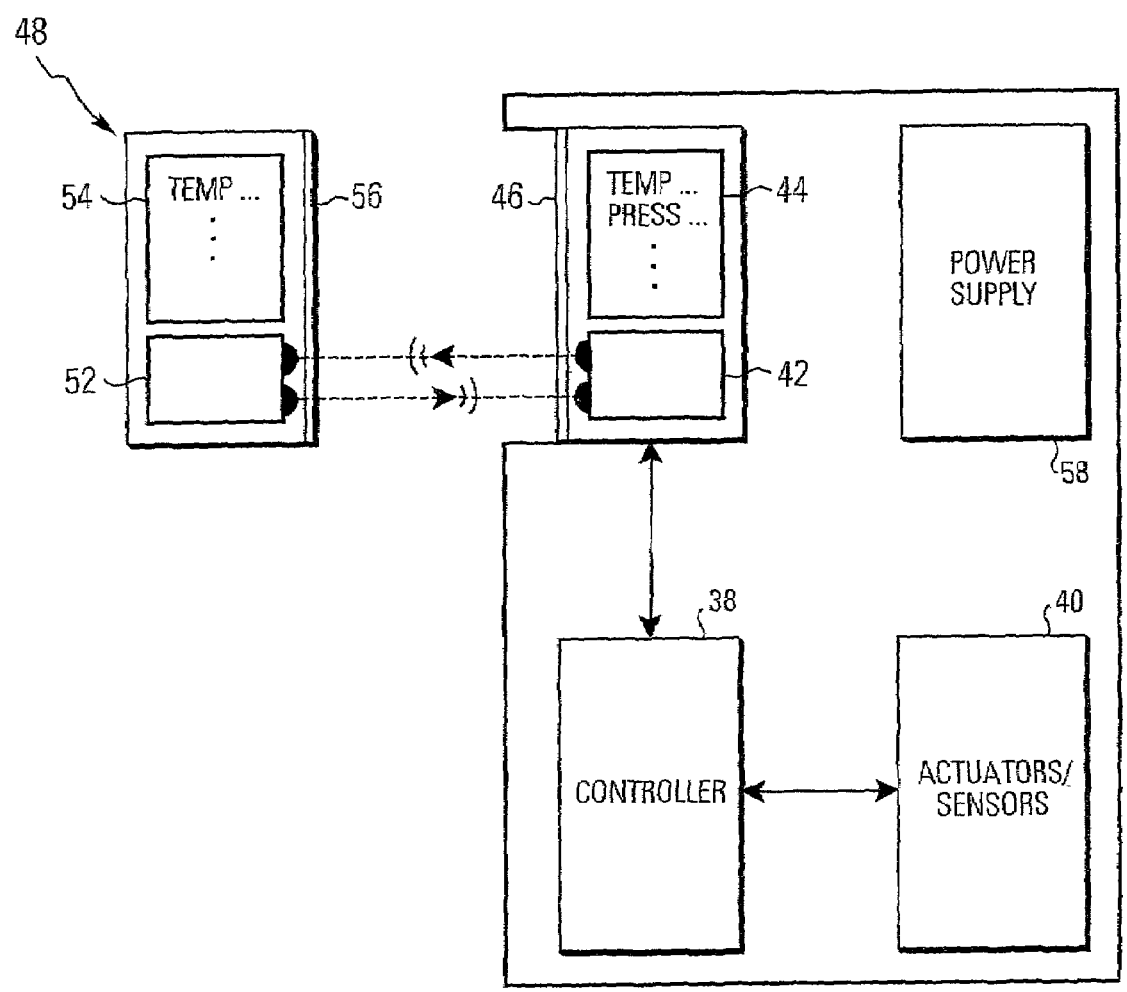
FIG. 4 shows a schematic diagram of another field device.

FIG. 4 shows a schematic diagram of another field device. Here the same corresponding parts as outlined above with respect to FIG. 3 or denoted using the same reference numerals and the explanation thereof will be omitted.

As shown in FIG. 4, the field device is of the stand-alone type and power supply is achieved through an internal power source 58. Also, exchange of information is based solely on the wireless link between the field device and the remote device 48 without any exchange of information over a control bus. Hereby efforts for wiring the control bus in the manufacturing field become obsolete.

Figure 5:
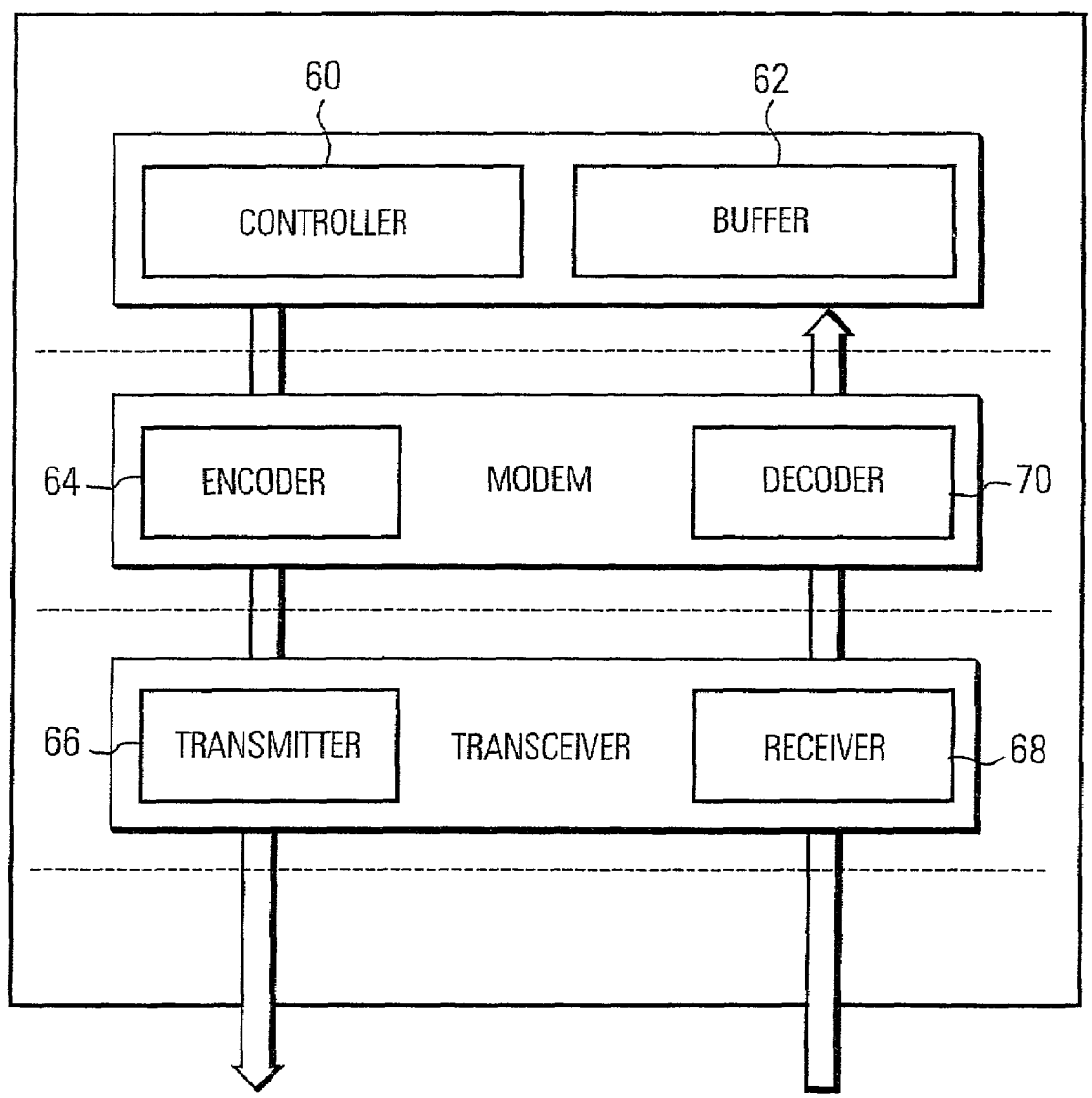
FIG. 5 shows a schematic diagram of a transmitter and/or receiver for wireless data communication.

FIG. 5 shows a schematic diagram of the wireless transmitter and/or receiver as shown in FIGS. 3 and 4 in more detail. It should be noted that any functionality to be described in the following may be realized in hardware, in software or a combination thereof.

As shown in FIG. 5, the transmitter and/or receiver 42, 52 divides into a controller section with a controller 60 and a buffer memory 62.

In the transmission path of the transmitter and/or receiver there is provided a coder 64 receiving data to be transmitted and driving a downstream transmitter 66.

In the reception part of the transmitter and/or receiver there is provided a receiver 68 being supplied with a transmission waveform and feeding pulses to a downstream decoder 70 for decoding into an output bit stream. The coder 64 and the decoder 70 form part of a modem section, and the transmitter 66 and the receiver 68 form part of a transceiver section.

Figure 6:
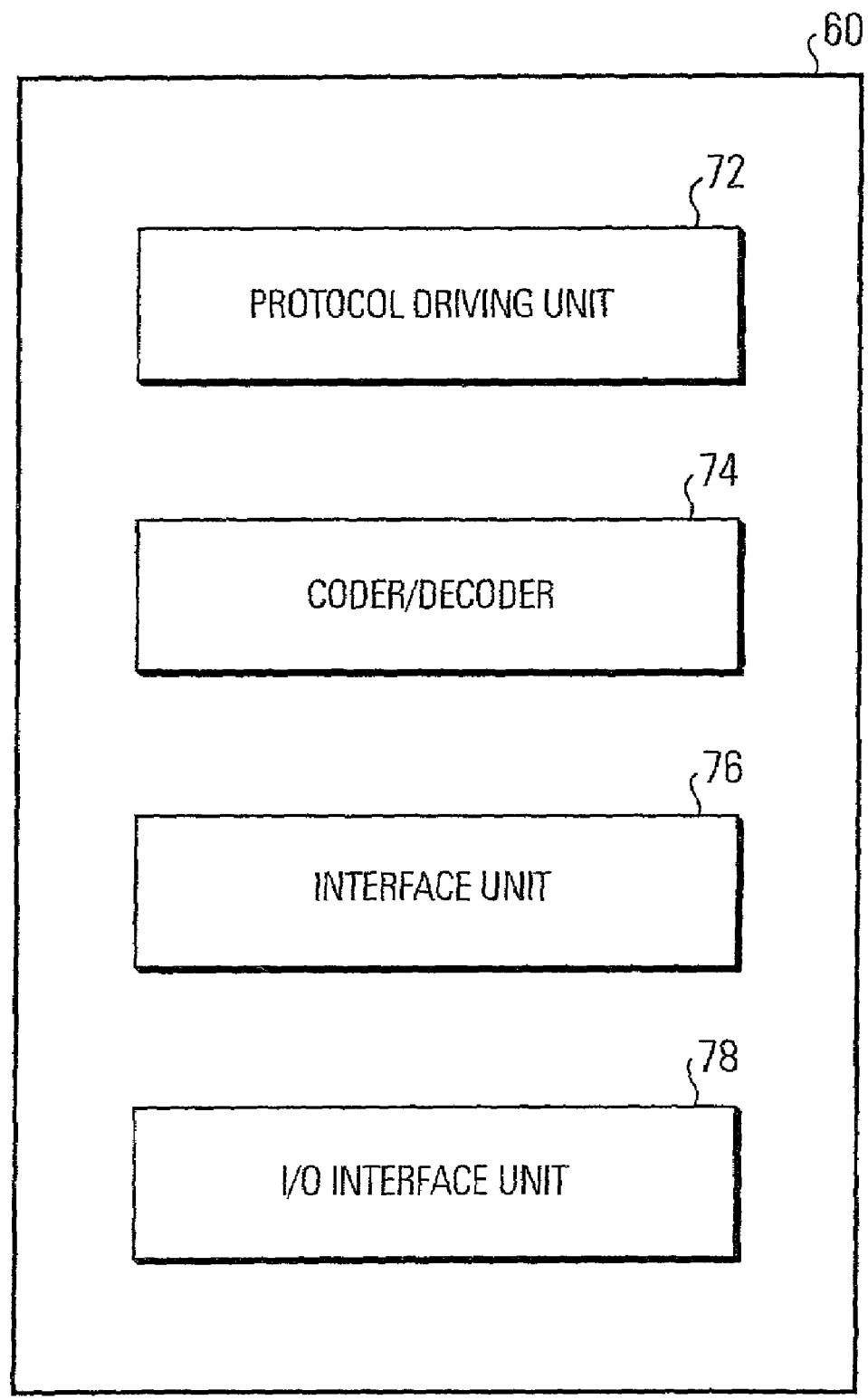
FIG. 6 shows a schematic diagram of the controller of the transmitter and/or receiver shown in FIG. 5.

FIG. 6 shows a schematic diagram of the controller of the transmitter and/or receiver shown in FIG. 5.

As shown in FIG. 6, the controller 60 divides into a protocol driving unit 72, a coder and/or decoder control unit 74, an interface unit 76 and an input/output interface unit 78.

Operatively, the protocol driving unit 72 stores different physical layer protocols used for transmission and/or reception and the exchange of information via the control bus. Further, the coder and/or decoder control unit 74 achieves a selection of an appropriate coding scheme to be used in the coder 64 in the related decoding scheme for use in the decoder 70. The interface unit 76 is provided to control the pulse waveform in the transmitter in compliance with a required data exchange distance and wireless transmission and/or reception conditions. The input and/or output interface unit 76 serves to set up an interface to the user of either the field device or the remote unit. The input and/or output interface unit is adapted to drive the display units 44, 54 for control of data input and/or output to the field device and/or remote device via a keyboard and further to the mapping of alpha numeric input data to an internally used data format.

As will be outlined in the following, wireless data communication may be achieved either in the infrared frequency range, in the radio frequency range, in the frequency range of visible light, or in the ultrasonic frequency range. In the following, the wireless infrared data communication will be explained with respect to FIGS. 7 to 12 and the wireless radio frequency transmission will be explained with respect to FIGS. 13 and 14.

Figure 7:
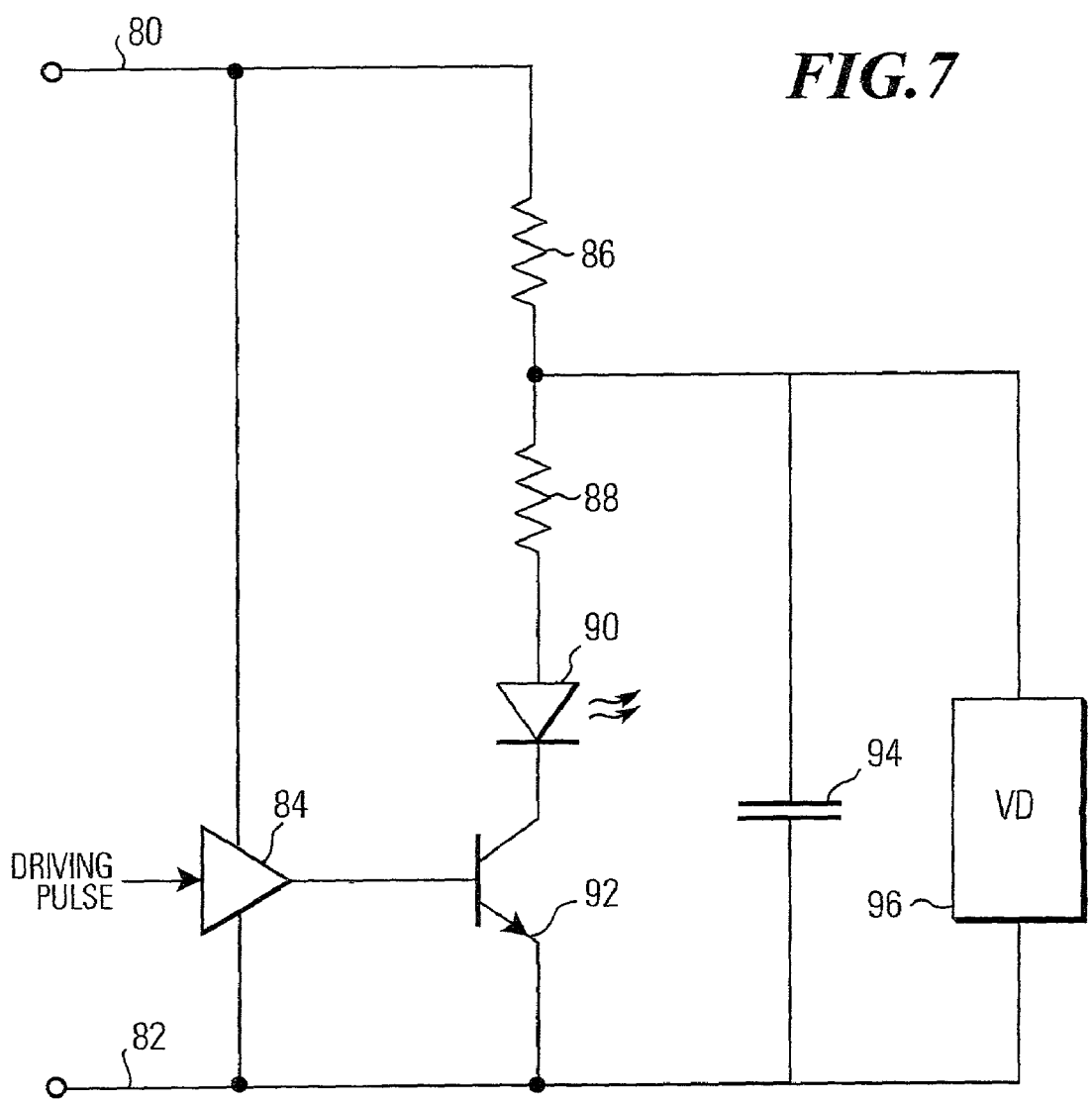
FIG. 7 shows a circuit diagram of an infrared transmitter.

FIG. 7 shows a circuit diagram of an infrared transmitter. As shown in FIG. 7, the infrared transmitter has a power supply line 80 and a ground line 82. The infrared transmitter comprises a driver amplifier 84 having a first power supply terminal connected to the power supply line 80 and a second power supply terminal connected to ground line 82. Between the power supply line 80 and the ground line 82 there is provided a first resistor 86, a second resistor 88, a light emitting element—e.g., a light emitting diode—90, and a switching transistor 92 connected in series. At the node connecting the first resistor 86 and the second resistor 88 there is provided a capacitor 94 branching off to ground. Across the capacitor 94 there is connected a voltage detector 96 for measurement of the voltage across the capacitor 94 and therefore of the energy suppliable by the capacitor 94.

Operatively, the infrared transmitter shown in FIG. 7 emits infrared waveforms according to power supplied to the driving amplifier 84. It is proposed to provide the capacitor 94 for intermediate energy storage when no power is consumed by the light emitting element 90. This allows to supply additional energy to the light emitting element 90 during infrared waveform transmission in case the energy supplied by the power supply line 80 is smaller than the infrared waveform transmission energy. The provision of the capacitor 94 is of particular advantage when using the infrared transmitter in a field device having restricted resources of power supply.

Further, the provision of the voltage detector 96 allows to always evaluate the energy available to the capacitor 94 and therefore a precise control of the operation of the transmitter shown in FIG. 7.

The first resistor 86 is provided to achieve a smooth energy flow from the power supply line 80 to the capacitor 94. The second resistor 88 is variable and tuned according to a desired irradiance of the light-emitting element 90 and according to a predetermined data exchange distance. The capacitance of the capacitor 94 is typically smaller than 100 mF, e.g., 68 mF and the resistance of the first and second resistor 86, 88 is smaller than 120 W and 10 W, respectively.

Figure 8:
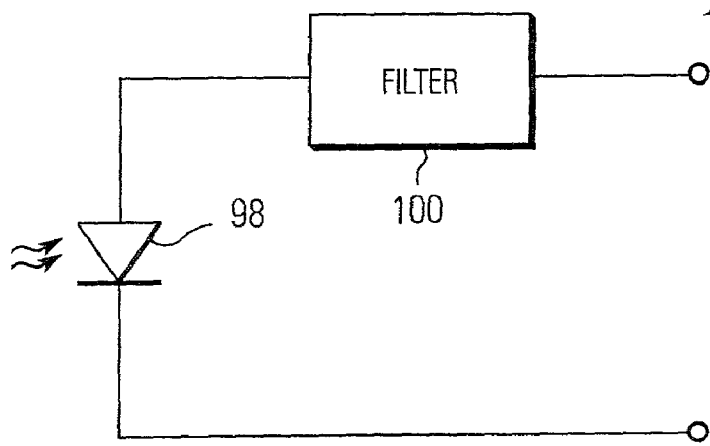
FIG. 8 shows a circuit diagram of an infrared receiver.

FIG. 8 shows a circuit diagram of an infrared receiver 68. As shown in FIG. 8, the infrared receiver comprises a light-receiving unit 98 (e.g., a photo diode) and a filter 100 connected thereto in series. The filter 100 is provided to filter out those components in the received infrared waveform signal that are not related to the transmission of data but to interfering signals, e.g., ambient light.

Figure 9:
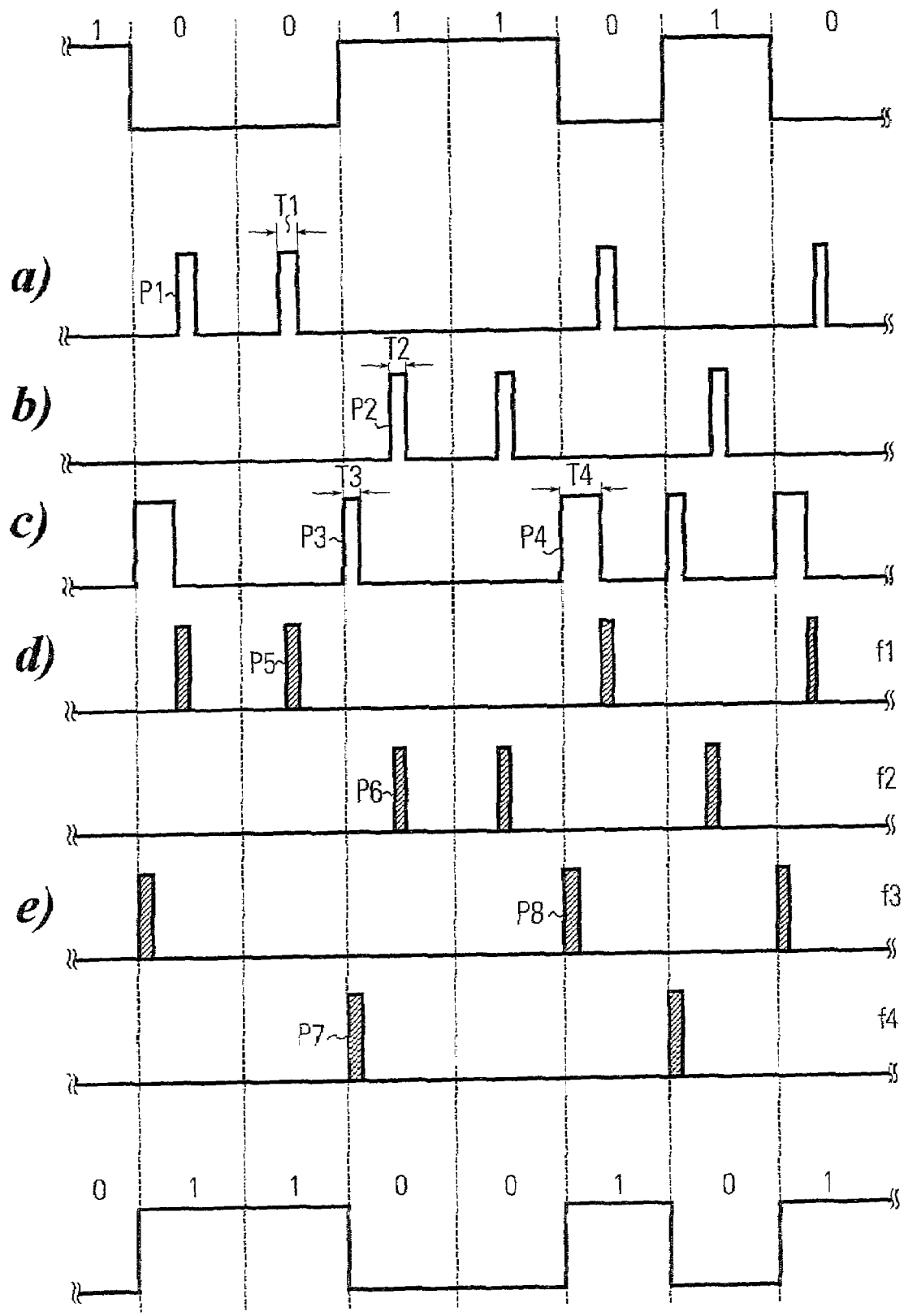
FIG. 9 shows coding schemes used for data exchange via infrared transmission and/or reception.

In the following coding schemes for wireless infrared communication will be described with respect to FIG. 9. It is to be noted that the coding schemes to be described hereinbelow are to be considered as examples only and that any physical layer having the characteristic to reduce the power consumption in comparison to an input bit stream may be used. While FIG. 9 shows different approaches to an appropriate coding it is further to be noted that clearly also a combination of these coding schemes is as well applicable within the framework of the described techniques.

The coding and/or decoding scheme shown in FIG. 9(a) relies on the idea to code only one of two input bits in the input data stream. The coded bit is assigned a pulse having a reduced pulse time period in comparison to the related bit pulse time period. While according to the coding scheme shown in FIG. 9(a) the L-bit is coded into pulse P1 with a pulse time period T1 the coding scheme shown in FIG. 9(b) uses a coding of the H-bit into a pulse P2 with a pulse time period T2.

The coding and/or decoding scheme shown in FIGS. 9(a), 9(b), are related to a physical layer IrDA where the ratio between the pulse time period of the coded pulse and the bit time period is 3/16.

This implementation has many advantages in the sense that any standard components available for this IrDA data transmission standard may easily be adapted to control applications in manufacturing fields without any compatibility problem.

Further, it enables the use of sub-standards published for the IrDa Standard i.e., the serial infrared link specification SIR, the link access protocol specification IrLAP and the link management protocol specification IrLMP. Also, it enables the use of extensions to the IrDA Standard with high-speed extensions of 1.152 Mbit/sec and 4.0 Mbit/sec while maintaining low power consumption essential for the operation of the field devices.

Yet another option within the IrDA standard framework is the use of the IrBus (or CIR (standard)) using the IEC 1603-1 sub-carrier frequency allocation with a carrier at 1500 kHz and having a transmission capacity of 72 kbit/sec.

Yet another option is the advanced IR standard (AIR 256 Kbit/sec, 7 meter exchange coverage) and the fast IR standard (FIR, minimum transfer rate of 16 Mbit/sec over more than 1 meter data exchange distance).

Further, IrDa physical layer enables to run any protocol such as FoxCom, HART, Profibus, Foundation Fieldbus, etc. between the field device and the remote device. In case the IrDA physical layer is used it is possible to integrate standard components into the manufacturing control system such as RS 232 interfaces.

FIG. 9(c) shows another coding and/or decoding scheme that may be used. Here, each transition from a L-bit to a H-bit is coded using a pulse P3 with a pulse time period T3 while each reverse transition from a H-bit to a L-bit is coded using a pulse P4 having a pulse time period T4>T3.

FIG. 9(d) shows a coding scheme where each L-bit is coded to a coded pulse P5 such that in response to this coded pulse P5 the infrared transmitter 66 transmits an infrared waveform having a first frequency f1. Each H-bit is coded with a pulse P6 such that in response to this coded pulse P6 the infrared transmitter 66 transmits an infrared waveform having a second frequency f2.

FIG. 9(e) shows a coding scheme where each transition from a L-bit to H-bit is coded into a pulse P7 such that in response to this pulse the infrared transmitter 66 transmits an infrared waveform having a third frequency f3. Also, each transition from a H-bit to L-bit is coded to a pulse P8 such that in response to this pulse the infrared transmitter 66 transmits an infrared waveform having a fourth frequency f4.

Further alternatives to code and/or decode two different bit levels 0, 1 (not shown) are the use of two light emitting diodes operating at two different frequencies. Here, each single light emitting diode would be assigned either to a first and second bit level or to a first and second transition between different bit levels. Yet another variation of the coding and/or decoding schemes shown in FIG. 9 would be to use a plurality of pulses with reduced pulse time periods for each state to be coded as long as a reduced power consumption is achieved.

Figure 10:
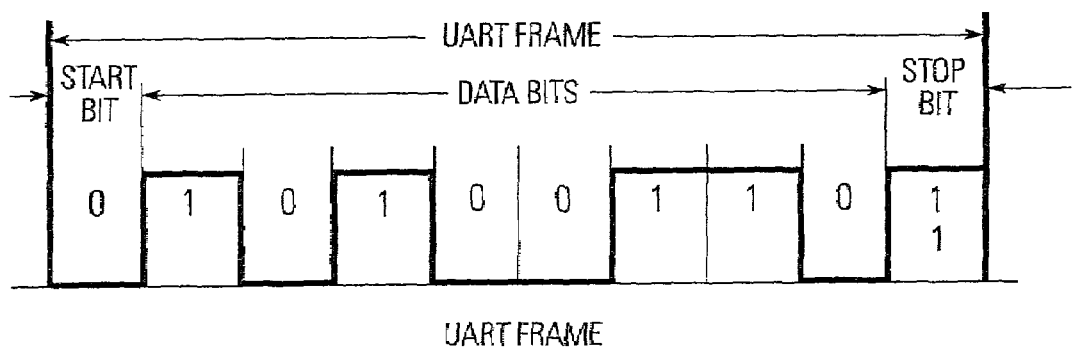
FIG. 10 shows a frame format used for data exchange via infrared transmission and/or reception.
Figure 10:
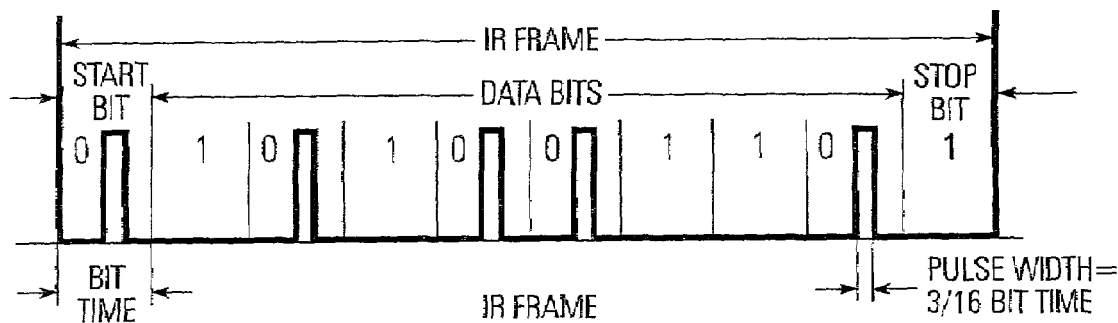

FIG. 10 shows a frame format used for data exchange via infrared transmission and/or reception. As shown in FIG. 10, coding may not only be carried out with respect to single data bits in an input data stream but also in compliance with a predetermined frame format, i.e. the UART frame format (universal asynchronous receiver/transmitter standard known from the field of personnel computation). While FIG. 10 shows the application of the coding scheme according to FIG. 9(a) to such a UART frame format it is to be noted that clearly any other coding scheme shown in FIG. 9 or any combination thereof may as well be applied to a frame format based coding scheme.

An important advantage with respect to the use of a frame format is that the input data stream may be segmented into input data segments for storage in the buffer memory 62 of the infrared transmitter and/or receiver shown in FIG. 5. In other words, it is proposed to divide the input bit stream into smaller segments which are then transmitted in sequence over time. This is of particular importance with respect to field devices since during transmission of data the energy stored in the field device will gradually decrease due to current consumption in the field device for the transmission process. When a data segmentation in the sense outlined above is used, the field device may receive further power from the control bus between two subsequent data segments to maintain infrared waveform transmission.

Figure 11:
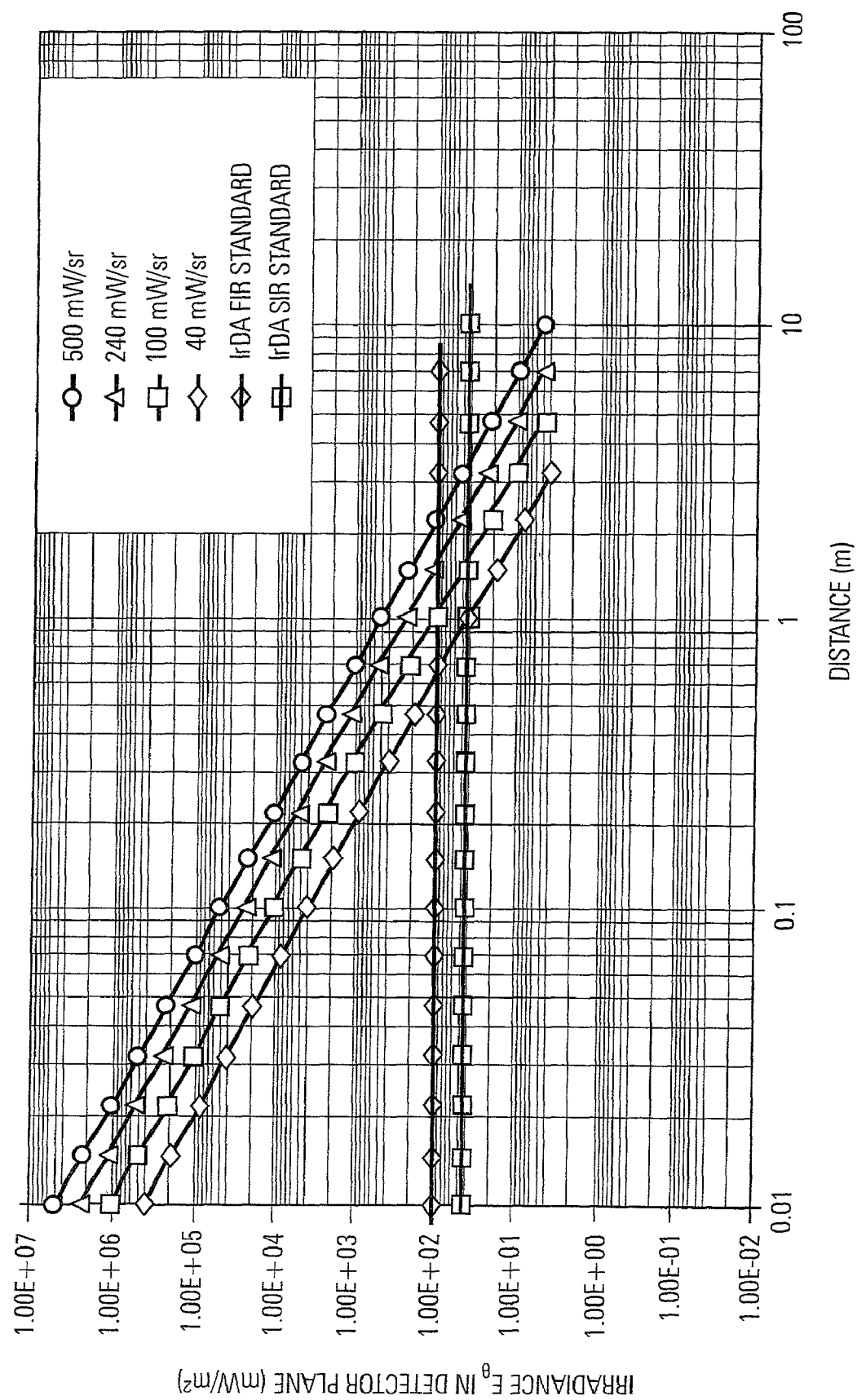
FIG. 11 shows the relation between the irradiance of the infrared transmitter and an achievable data exchange distance.

FIG. 11 shows a relation between the irradiance of the infrared transmitter and an available data exchange distance. As already outlined above the irradiance of the infrared transmitter may be derived by tuning the second resister 84 shown in FIG. 7 and therefore by tuning the current flowing over the light emitting element 90.

FIG. 11 allows to determine the data exchange distance as a function of the irradiance at the infrared transmitter. Assuming that a minimum irradiance at the receiver is 40 mW/m2 combined with an intensity of 40 mW steradian (3r) the resulting data exchange distance is 1 m. In case the minimum irradiance at the receiver is 100 mW/m$^2$ with the same intensity of 40 mW/sr the data exchange distance will only be 70 cm. In the same way, achievable data exchange distances may be derived from the diagram shown in FIG. 11 for different transmitter irradiance values and intensities.

Figure 12:
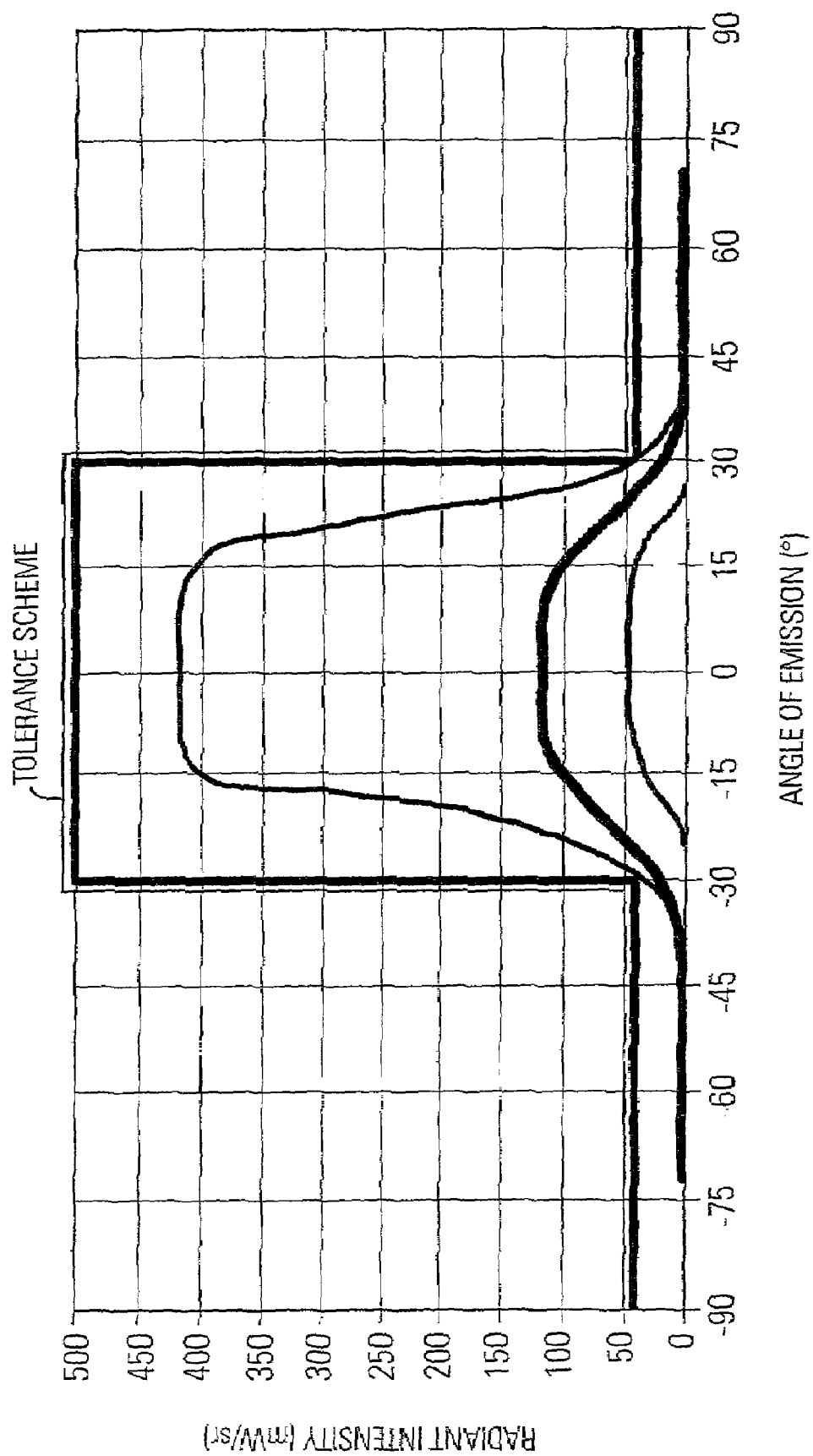
FIG. 12 shows a relation between a radiant intensity of the infrared transmitter and an angle of emission.

FIG. 12 shows a relation between a radiant intensity of the infrared transmitter and an angle of emission. As shown in FIG. 12, the optical radiant intensity should be limited to a maximum value, e.g., 500 mW/sr and an angle of +30° to enable an independent operation of more than one field device or remote device in the manufacturing field. Heretofore, FIG. 12 shows a tolerance field scheme for infrared transmitter emission characteristics and typical emission curves of infrared transmitters.

In the following, a transmitter and/or receiver for wireless data communication in the radio frequency range will be explained with respect to FIGS. 13 and 14. Here, it should be noted that the principles for coding an input data stream as explained with respect to infrared wireless data communication are as well applicable to the wireless data exchange in the radio frequency range. Further, those parts shown in FIG. 13 being identical to those previously discussed with respect to FIG. 7 are denoted using the same reference numerals and the explanation thereof will be omitted.

Figure 13:
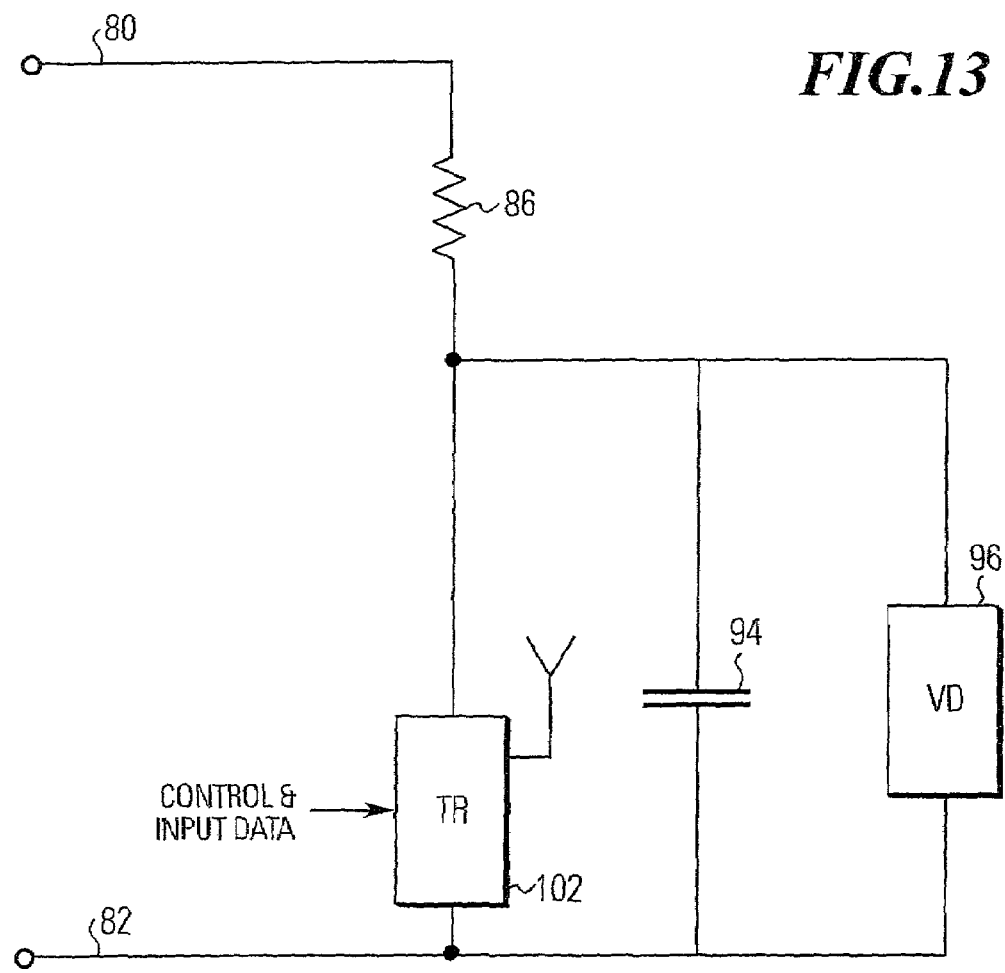
FIG. 13 shows a circuit diagram of a radio frequency transmitter.

As shown in FIG. 13, in case wireless data communication is executed in the radio frequency range, there is provided a radio frequency transmitter 102 in series to the first resistor 86. This radio frequency transmitter 102 substitutes the second resistor 88, the light emitting diode 90, the switching transistor 92, and the driving amplifier 84 shown in FIG. 7.

Operatively, the radio frequency range transmitter shown in FIG. 13 uses the first resistor 86 to restrict the current to the energy buffer 94. The voltage detector 96 is provided to measure the energy suppliable by the capacitor 94. Control data and input data are supplied to the radio frequency range transmitter 102 before subsequent transmission of the input data. The radio frequency range transmitter may have a programmer power control input terminal receiving digital input data to determine the output power of the transmitter 102.

Figure 14:
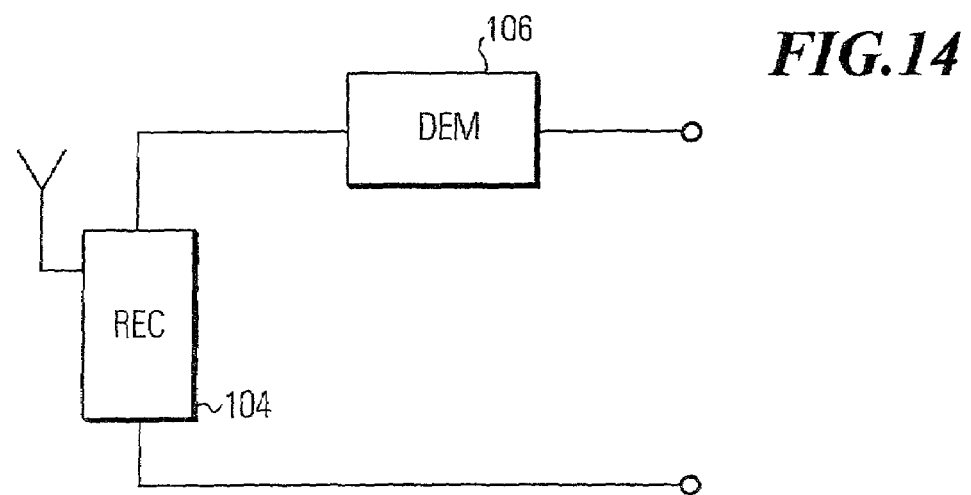
FIG. 14 shows a circuit diagram of a radio frequency receiver.

FIG. 14 shows the structure of a radio frequency receiver. As shown in FIG. 14, the radio frequency receiver divides into a receiver section 104 and a demodulator section 106. Operatively, the receiver section 104 transmits a radio frequency signal into an intermediate frequency or base band signal for subsequent processing by the demodulator 106.

As already outlined above, also for the wireless communication with radio frequency the receiver section may be operated in compliance with the energy available for wireless data reception. In other words, the receiver section may be activated and/deactivated into a standby mode until either enough energy is available for wireless data reception or during wireless data transmission. Another alternative is that it is recognized at the receiver that the received address is not related to the field device comprising the receiver section. Yet another alternative is to put the receiver section into a standby mode during the setup of a response to be transmitted by the field device after receiving a request for data transmission. The use of a standby mode in the receiver section in accordance with difference operative conditions allows to reduce the current consumption of the receiving section from, e.g., a range of 20 mA to 60 mA to only some µA.

It should be noted, while in the above the infrared and radio frequency transmission have been described separately, it is clearly possible to combine both transmission methods within a certain application.

Further, it should be noted that the concepts explained with respect to wireless data communication may as well be applied to the change of data using visible light and the ultrasonic frequency range.

In the following, the method of exchanging data in a manufacturing field using wireless transmission will be described with respect to FIGS. 15 and 16.

Figure 15:
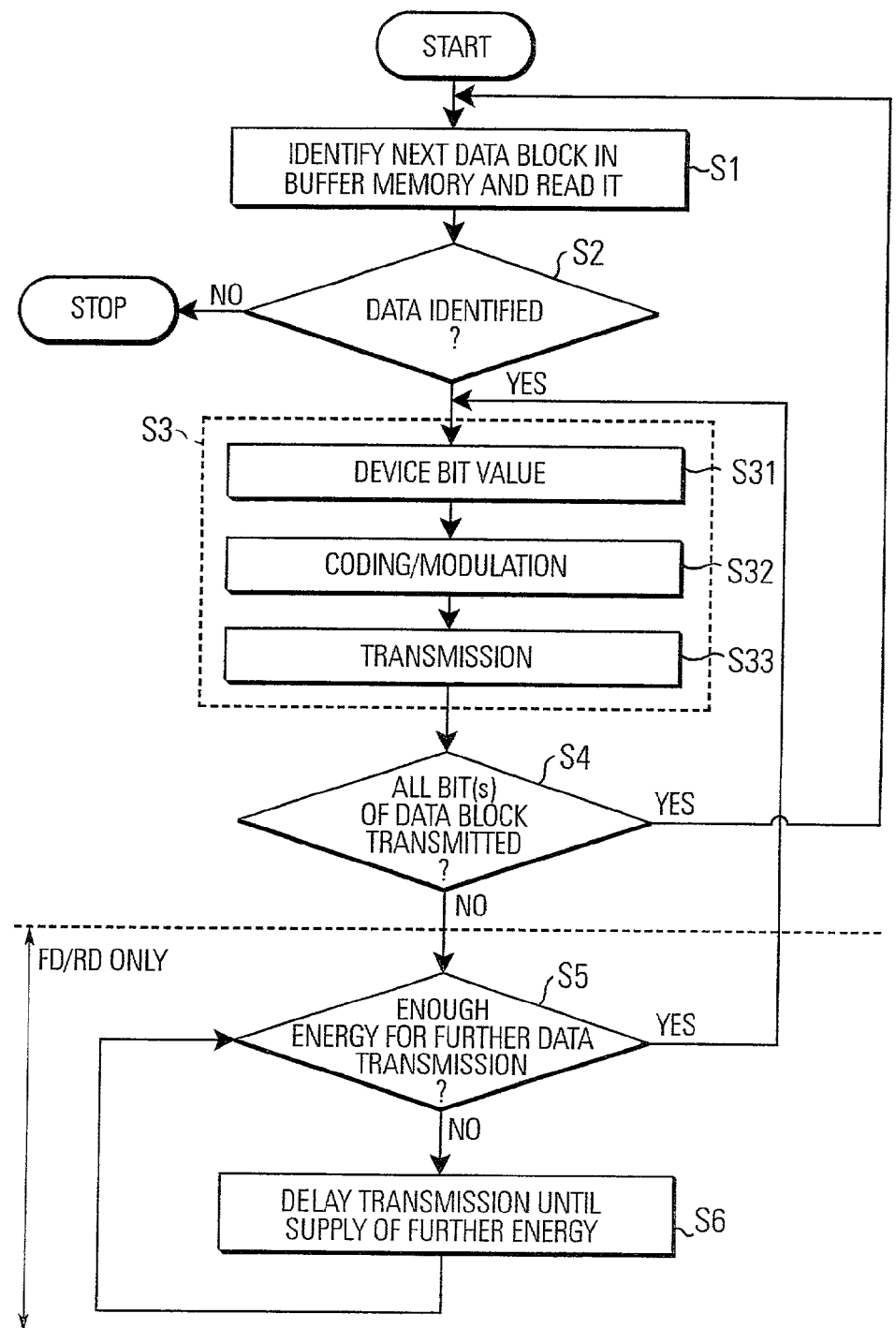
FIG. 15 shows a flowchart for a method of transmitting data.

FIG. 15 shows a flowchart for a method of transmitting data. As shown in FIG. 15, initially in step S1 the next data block stored in the buffer memory 62 is identified to check for further transmission data. Then, an interrogation takes place in step S2 to check whether data to be transmitted is identified in the first step S1. If this is not the case, the procedure ends. Otherwise, a bit wise transmission of each bit in the identified data block is carried out in step S3. Step S3 divides into the derivation of a bit value in step S31, the coding or modulation of the bit in step S32 according to, e.g., one of the coding schemes outlined above with respect of FIG. 9, and a subsequent wireless transmission in Step S33.

As shown in FIG. 15, after transmission of each bit there follows an interrogation in step S4 whether all bits of a data block have been transmitted. In the affirmative case the procedure returns to step S1 to check for further data to be transmitted.

When data is transmitted from a field device to a remote device or a further remote unit in the manufacturing control system it is checked in Step S5 whether enough power for further data transmission is available. If this is the case, the procedure returns to step S3 for transmission of the next data bit. Otherwise, the transmission process is delayed in step S6 until supply of further energy to the field device. This evaluation of available energy before data transmission allows to avoid any loss of data during data transmission.

Figure 16:
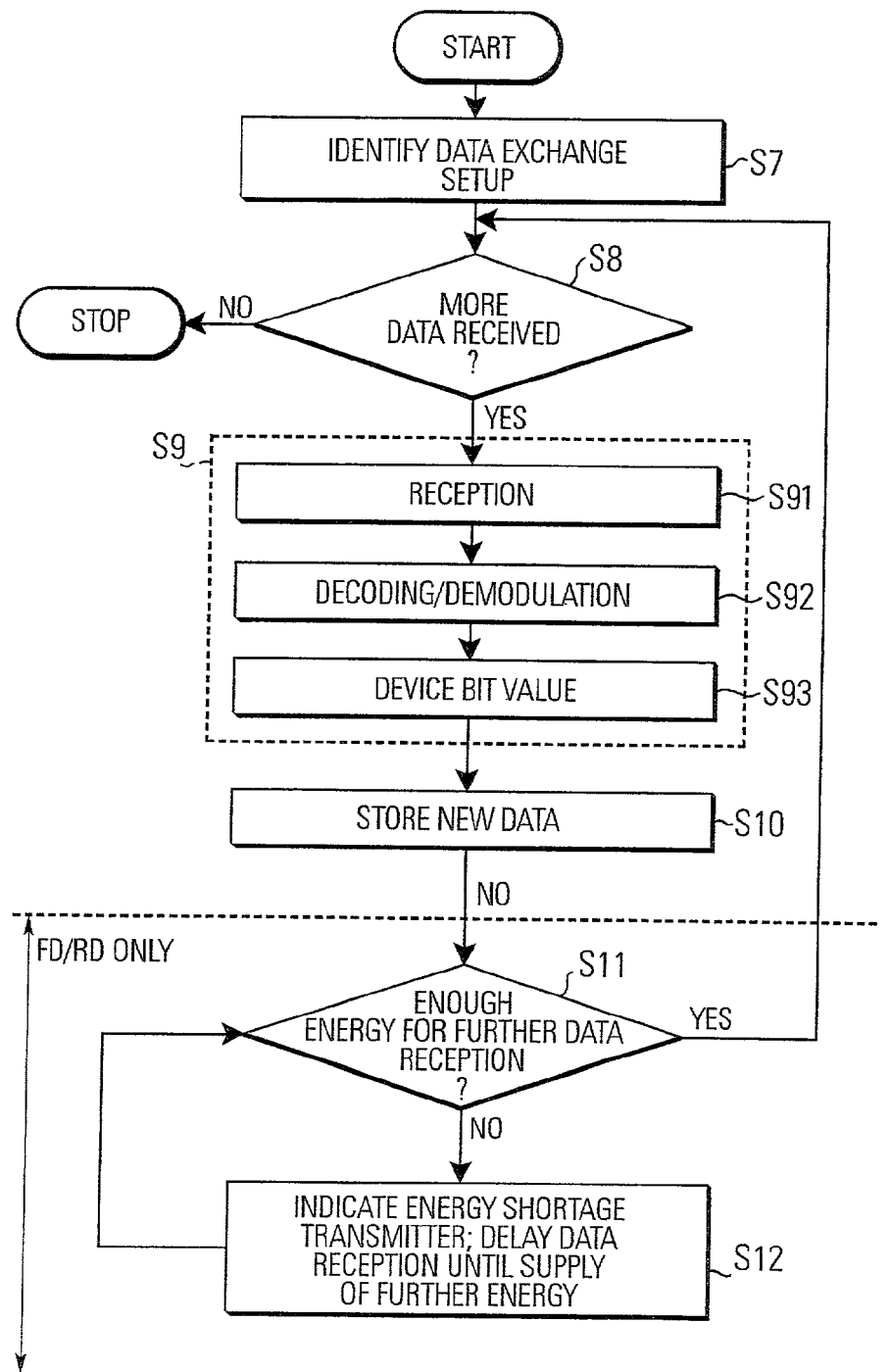
FIG. 16 shows a flowchart for a method of receiving data.

FIG. 16 shows a flowchart for a method of receiving data. As shown in FIG. 16, initially a data exchange setup is identified in step S7 before the reception of actual data. Then follows an interrogation step S8 to evaluate whether more data is received or not. If this is not the case the procedure ends. Otherwise, data is received, e.g., bit by bit in step S9. This reception step S9 divides into a first step S91 for waveform reception, a step S92 for decoding or demodulating the received waveform, and step S93 to derive the received bit value. Subsequent to each data bit reception step S9 there follows the storage of the new data bit in step S10.

As shown in FIG. 16, in case the field device is receiving data either from a remote device or another transmitter in the manufacturing control system after each step S10 to store received data there follows an interrogation in step S11 to check whether enough energy for further data reception is available in the field device. In the affirmative case the procedure branches back to S8 to check whether more data is received. Otherwise, the field device will indicate energy shortage to the transmitter for delay of data reception until supply of further energy to the field device in step S12.

While in the above aspects of wireless transmission with respect to coding and/or decoding and implementation of wireless transmission in field devices have been discussed with respect to FIGS. 3 to 16 in the following system aspects and the use of the wireless transmission within a manufacturing control system will be discussed with respect to FIGS. 17 to 22.

Figure 17:
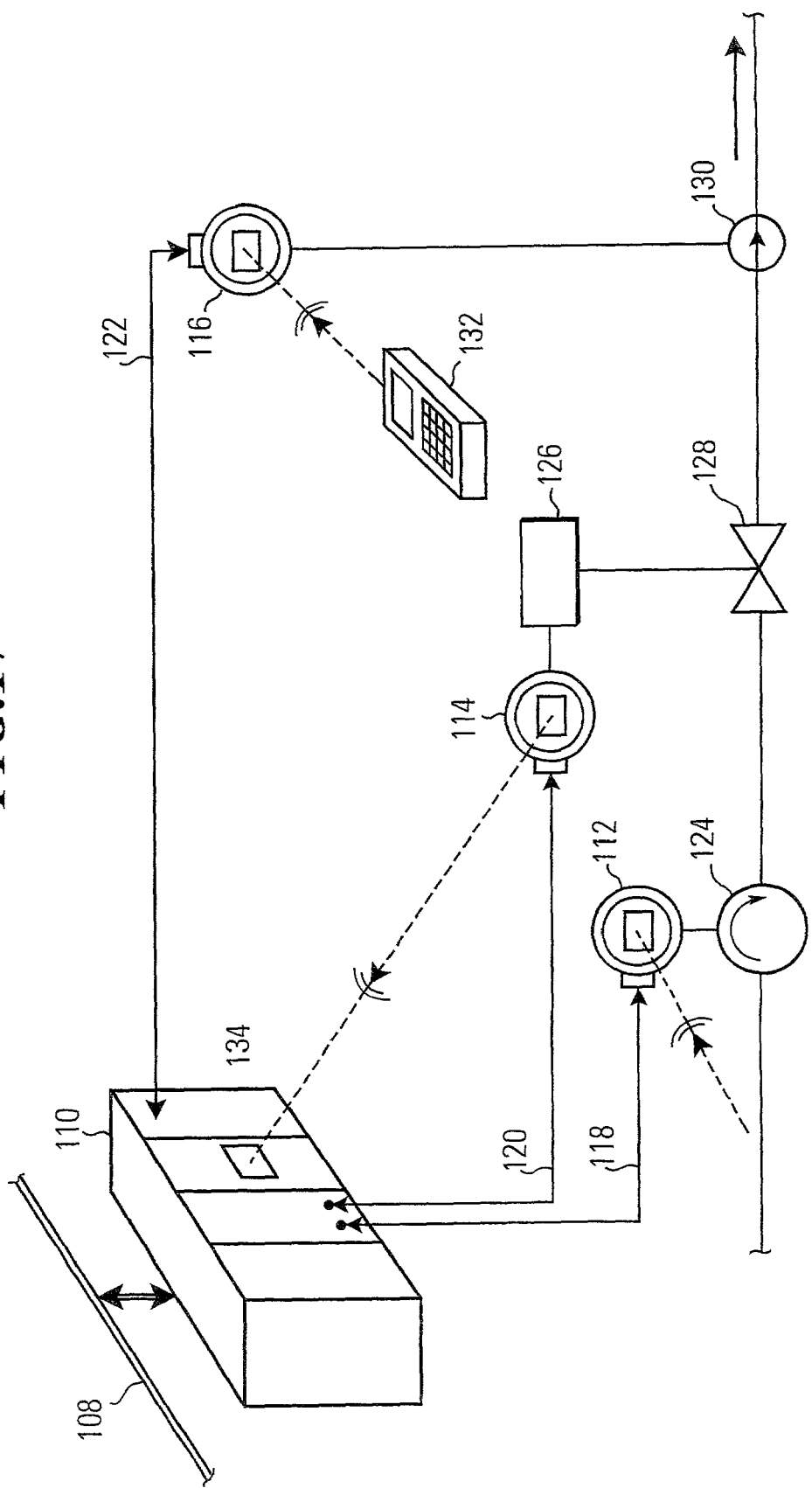
FIG. 17 shows a schematic diagram of a manufacturing plant control system using unidirectional wireless data transmission.

FIG. 17 shows a schematic diagram of a typical manufacturing plant control system using unidirectional wireless data transmission. The manufacturing plant control system comprises a central controller (not shown) coupled to a system bus 108. To the system bus 108 there is coupled at least one functional unit 110 comprising, i.e., bus couplers or master units for control of attached field devices. As shown in FIG. 17, the functional unit 110 is connected to a plurality of field devices, 112, 114 and 116 via control buses 118, 120 and 122, respectively.

As also shown in FIG. 15, the field device 112 is connected to a pump 124 in a fluid path, the field device 114 is connected via an actuator 126 to a control valve 128, and the field device 116 is connected to a flow rate sensor 130. Each field device 112, 114, 116 is provided with a wireless data communication transmitter and/or receiver so that a remote device 132 may be used for data exchange, i.e. for configuration, display of sensor data and testing purposes.

Operatively, the manufacturing plant control system shown in FIG. 17 achieves a control of the fluid flow rate through data exchange over the system bus 108 and the control buses 118, 120 and 122. This allows to control the pump 124, the control valve 128 and forward the measured flow rate from the flow rate sensor 130 back to the system controller.

Further, it is also possible to have access to the different field devices 112, 114 and 116 for configuration, display of sensor data or testing purposes. As also shown in FIG. 17, a field device 114 may also directly communicate with a wireless transmitter and/or receiver 134 of the functional unit 110.

The provision of wireless communication links allows to increase the available bandwidth for data exchange and facilitates the access to field devices for an operator running the manufacturing plant control system.

Figure 18:
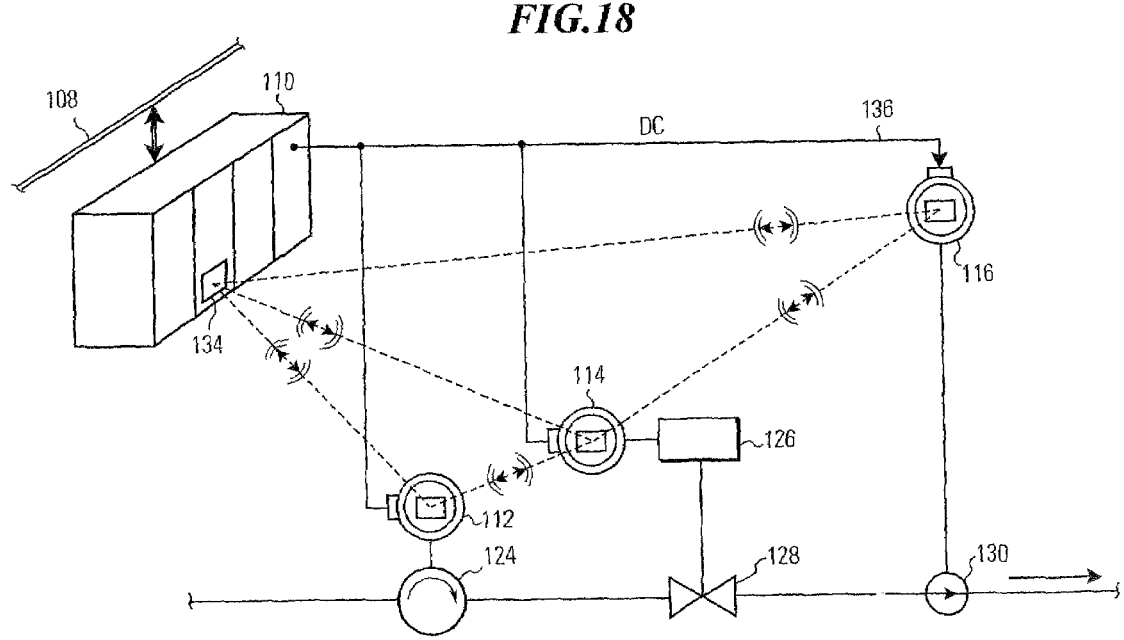
FIG. 18 shows a schematic diagram of another manufacturing plant control system using bi-directional wireless data transmission.

FIG. 18 shows a schematic diagram of another manufacturing plant control system using bi-directional infrared data exchange. Those elements being identical or corresponding to the one previously discussed with respect to FIG. 17 are denoted using the same reference numerals and the explanation thereof will be omitted.

As shown in FIG. 18, this further manufacturing plant control system uses bi-directional wireless communication instead of unidirectional wireless communication. Therefore, it is possible to omit control buses and to build up the control system downstream the functional unit 110 using wireless communication only. Heretofore, only a DC power supply 136 to each field device 112, 114 and 116 must be provided for.

As shown in FIG. 18, using bi-directional wireless communication each field device 112, 114 and 116 may directly communicate with at least one transmitter and/or receiver 134 provided in the functional unit 110. Also, wireless data exchange may as well occur between different field devices, i.e., the field devices 112 and 114 or the field devices 114 and 116. The routing of wireless data communication over different field devices is particularly advantageous in case an obstacle blocks a direct data exchange between the functional unit 110 and the field devices 112, 114, 116.

Figure 19:
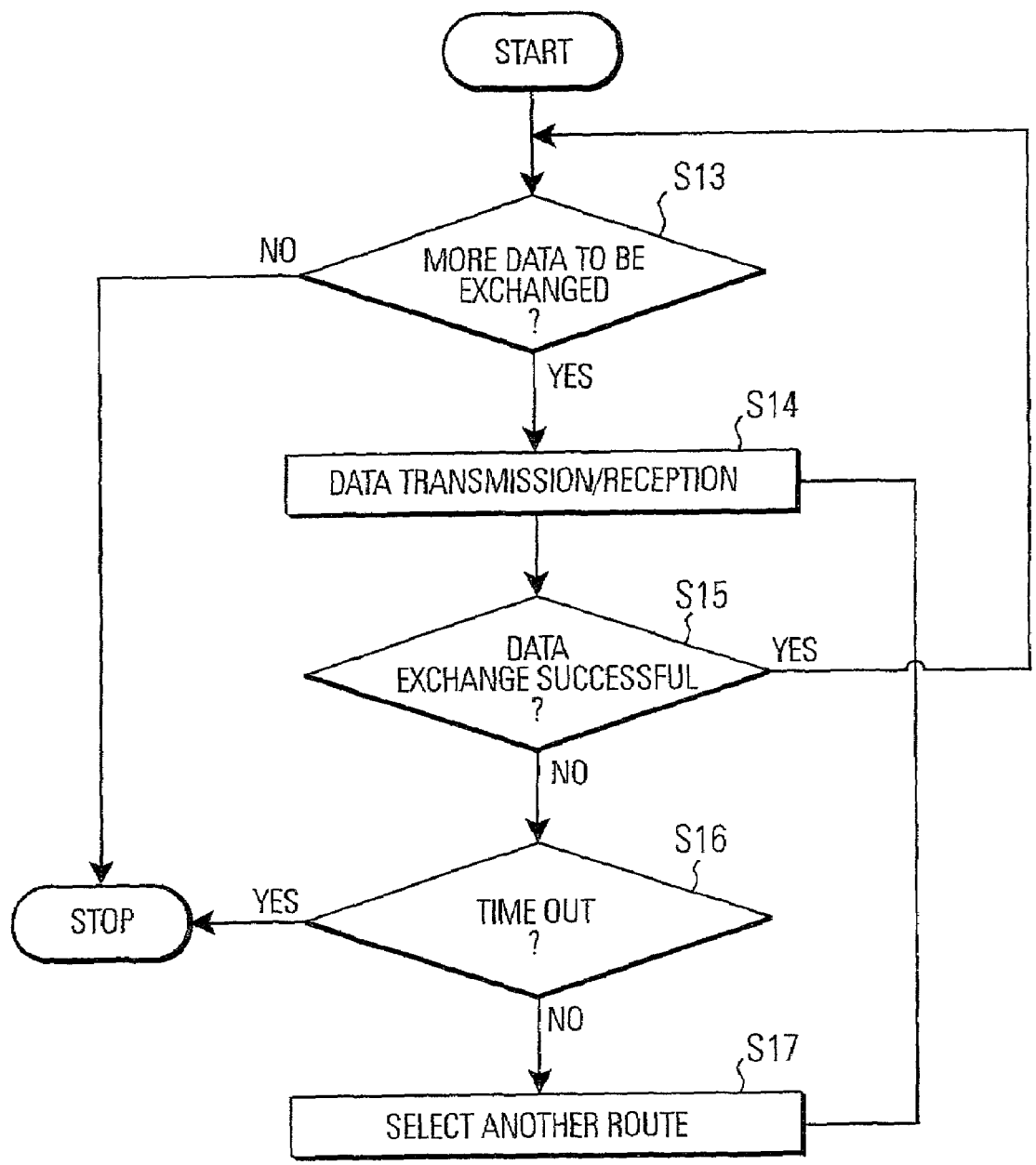
FIG. 19 shows a flowchart for a method of handling wireless data transmission bottlenecks in the manufacturing plant control system shown in FIG. 18.

FIG. 19 shows a flowchart for a method of handling wireless data transmission bottlenecks/obstacles in the manufacturing plant control system shown in FIG. 18. As shown in FIG. 19, initially there is carried out an interrogation step S13 to check whether more data is to be exchanged. Then follows a data transmission and/or reception step S14 followed by a further interrogation in step S15 to check whether the data exchange has been successful. In the affirmative case the procedure returns to step S13. Otherwise, an additional interrogation takes place in step S16 to check whether a time out has occurred i.e., whether multiple tries for data transmission and/or reception did not lead to the required exchange of data. If this is the case, the procedure stops. Otherwise, another route for data exchange is selected in step S17 and the procedure returns to step S14 for further data transmission and/or reception.

Figure 20:
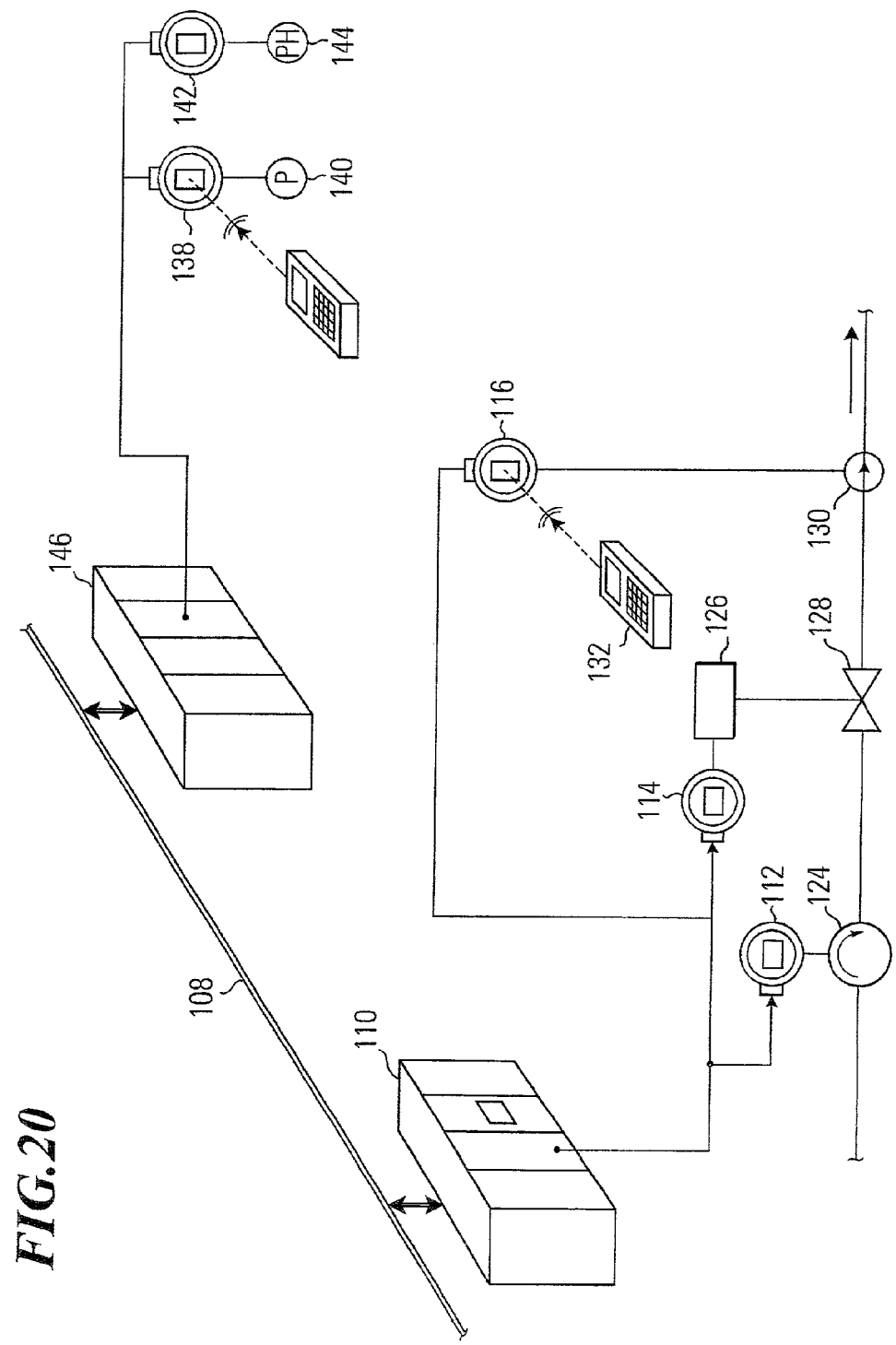
FIG. 20 shows a schematic diagram of yet another manufacturing plant control system with field devices having sensors of different types.

FIG. 20 shows a schematic diagram of yet another manufacturing plant control system with field devices having sensors of a different type. As shown in FIG. 20, field devices may be used with a plurality of sensors, i.e., field device 138 with respect to a pressure sensor 140 and field device 142 with respect to a pH sensor 144. Also, it is possible to access these further pressure sensor 140 and pH sensor 144 in a remote manner via the remote terminal 132, the field device 116 and the functional unit 110 and the further functional unit 146. This is particularly advantageous in case the operator or the remote device 132 also needs information about a pressure and/or pH value without having the possibility of direct access to the related field devices 138, 142.

Figure 21:
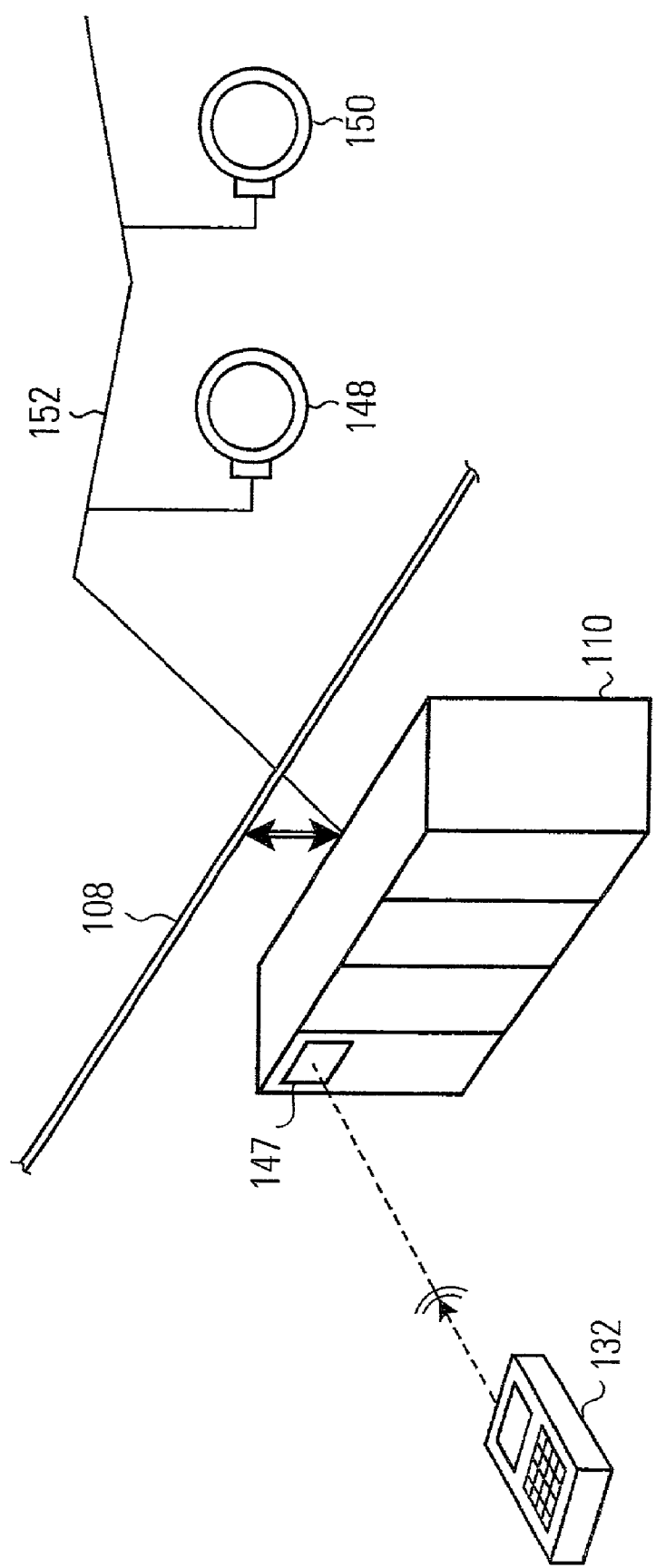
FIG. 21 shows a schematic diagram of yet another manufacturing plant control system using a remote access to field devices via wireless communication.

FIG. 21 shows a schematic diagram of yet another manufacturing plant control system using an indirect access to field devices via wireless communication. As shown in FIG. 21, the remote device 132 has access to a transmitter and/or receiver 147 provided in, e.g., the master of the functional unit 110. Data is exchanged with field devices 148, 150 having no transceiver and/or receiver for wireless data communication via a field bus 152 or any network logically or physically coupled to the fieldbus.

Another variation to the implementation shown in FIG. 21 would be that a plurality of field devices are connected to the fieldbus 152. One of the field devices is provided with a transceiver and/or receiver for wireless data communication and therefore allows to achieve a remote access to all other field devices being linked to the field bus 152. In other words, the field device comprising the transmitter and/or receiver for wireless communication would be used as access point or portal for remote access for all remaining field devices being linked to the fieldbus 152.

Figure 22:
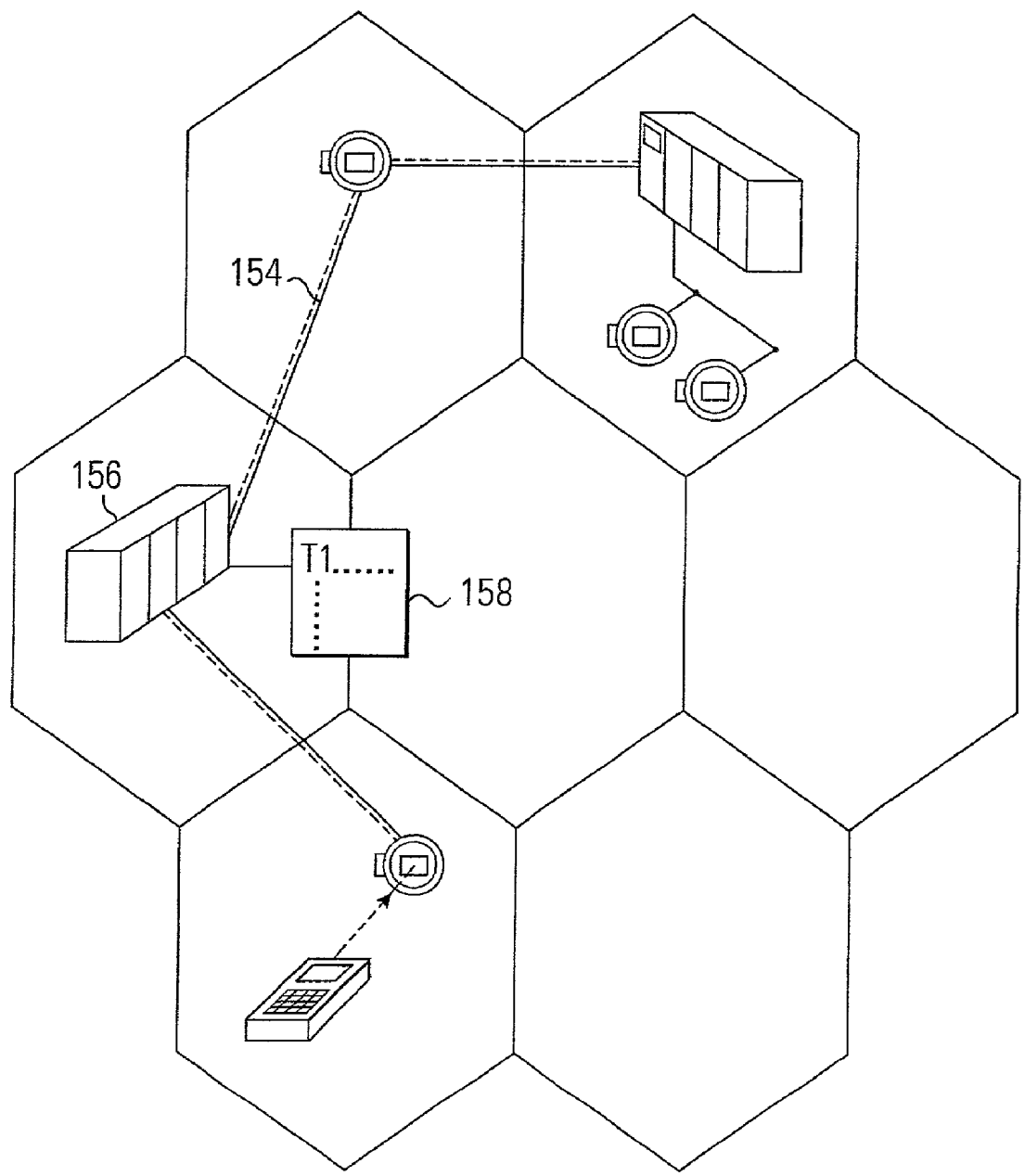
FIG. 22 shows a schematic diagram of yet another manufacturing plant control system using a remote access network to link different sub-systems having a wireless transmitter and/or receiver.
Figure 22:

FIG. 22 shows a schematic diagram of yet another manufacturing plant control system having a remote access network 154 to link different components provided with a transmitter and/or receiver for wireless data communication. As shown in FIG. 22, the manufacturing plant control system using the remote access network 154 differs over the previously discussed systems in that the remote access network is provided as dedicated link between different devices having a transmitter and/or receiver for wireless data communication. This is particularly advantageous in case a remote access is required also when other communication channels (i.e., the control bus) are not available, i.e. due to lack of power supply. Typically, a request for data exchange would indicate the source ID of the remote device initiating the request, further the target ID of the field device to which the remote access is carried out, and data specifying operations to be taken in response to the remote access. The indication of the source ID may be used to send the result of the operation back to the remote terminal wherefrom the request for a remote access originated.

As shown in FIG. 22, at least one functional unit 156 coupled to the remote access network 154 supports a data base 158 registering the availability and position of different remote devices in the manufacturing field. This information may then be used to forward messages between the different remote devices or from a system controller to an operator carrying a remote device or vice versa.

While in the above, the described techniques have been described with reference to schematic and circuit diagrams of various implementations of the field device, it should be noted that clearly the described techniques may also be implemented using the method of data exchange digitally using a microcontroller. In this case, the described techniques may be implemented as a computer program product directly loadable into the internal memory of the microcontroller comprising software code portions for implementing the method.

A number of implementations have been described. Nevertheless, it will be understood that various modifications may be made. Accordingly, other implementations are within the scope of the following claims.

What is claimed:

1. A field device comprising:
   a wireless transmitter configured to transmit data from the field device to a remote device when activated;
   an interface coupled to a bus, wherein the bus supplies power and control signals to the field device through the interface, the power being insufficient to sustain operation of the wireless transmitter when the wireless transmitter is activated;
   an energy buffer configured to store energy from the power supplied to the field device via the interface, and to supply the stored energy to the wireless transmitter while the wireless transmitter transmits data from the field device to the remote device to sustain operation of the wireless transmitter;
   at least one actuator and/or sensor adapted to alter and/or sense a control and/or process variable in a manufacturing field,
   a memory configured to store a data stream for transmission by the wireless transmitter, wherein the data stream is divided into multiple segments; and
   a controller configured to, for each one of the multiple segments, evaluate an amount of the stored energy available in the energy buffer prior to activating the transmitter to transmit the segment and, when the evaluation indicates that the stored energy in the energy buffer is insufficient to sustain operation of the wireless transmitter during transmission of the segment, delay activation of the wireless transmitter for transmission of the segment until the stored energy in the energy buffer is sufficient to sustain operation of the wireless transmitter during transmission of the segment.

2. The field device of claim 1 wherein the transmitter and/or receiver is adapted to operate in the radio, visible light or ultrasonic frequency range.

3. The field device of claim 1 wherein the transmitter and/or receiver is adapted to operate in the infrared frequency range.

4. A field device comprising:
   a wireless transmitter and/or receiver configured for wireless data communication between the field device and a remote device when activated;
   an interface coupled to a bus, wherein the bus supplies power and control signals to the field device through the interface, the power being insufficient to sustain operation of the wireless transmitter and/or receiver when the wireless transmitter is activated;
   an energy buffer configured to store energy from the power supplied to the field device via the interface, and to supply the stored energy to the wireless transmitter and/or receiver during wireless data communication to sustain operation of the wireless transmitter and/or receiver;
   at least one actuator and/or sensor adapted to alter and/or sense a control and/or process variable in a manufacturing field;
   a controller configured to evaluate an amount of the stored energy available in the energy buffer prior to activation of the transmitter and/or receiver and, when the evaluation indicates that the stored energy in the energy buffer is insufficient to sustain operation of the wireless transmitter and/or receiver during wireless data communication, delay activation of the wireless transmitter and/or receiver until the amount of stored energy in the energy buffer is sufficient to sustain operation of the wireless transmitter and/or receiver during wireless data communication.

5. The field device of claim 4 wherein the controller is adapted to split an input data stream into a plurality of data segments for subsequent wireless data transmission.

6. The field device of claim 4 wherein the transmitter and/or receiver is adapted to operate in the radio, visible light or ultrasonic frequency range.

7. The field device of claim 4 wherein the transmitter and/or receiver is adapted to operate in the infrared frequency range.

8. The field device of claim 7 wherein the transmitter and/or receiver comprises a coder unit adapted to
   receive an input bit stream with first input bits having a bit pulse time period and a first bit pulse amplitude and second input bits having the bit pulse time period and a second bit pulse amplitude; and to
   code each input bit of the input bit stream such that each generated coded pulse has a pulse time period shorter than the bit pulse time period.

9. The field device of claim 8 wherein the coder unit is adapted to:
- code each first input bit of the input bit stream into at least one first driving pulse for supply to the transmitter, each first driving pulse having a first driving pulse time period being shorter than the bit pulse time period and a first driving pulse amplitude;
- code each second input bit of the input bit stream to a second driving pulse, the second driving pulse having the first bit pulse time period and an amplitude of zero.

10. The field device of claim 9 wherein the ratio between the first driving pulse time period and the bit pulse time period is 0.01 to 0.98.

11. The field device of claim 10 wherein the first driving pulse is synchronized to the first input bit or to the second input bit.

12. The field device of claim 11 wherein the ratio between the first driving pulse time period and the bit pulse time period is 3/16 according to a physical layer IrDA.

13. The field device of claim 10 wherein the ratio between the first driving pulse time period and the bit pulse time period is 3/16 according to a physical layer IrDA.

14. The field device of claim 8 wherein the coder unit is adapted to:
- code each transition from the first input bit pulse amplitude to the second input bit pulse amplitude in the input bit stream into at least one third driving pulse for supply to the transmitter, each third driving pulse having a third driving pulse time period being shorter than the bit pulse time period and a third driving pulse amplitude;
- code each transition from the second bit pulse amplitude to the first bit pulse amplitude in the input bit stream to at least one fourth driving pulse, each fourth driving pulse having the third driving pulse amplitude and a fourth driving pulse time period being larger or smaller than the third driving pulse time period and smaller than the bit pulse time period.

15. The field device of claim 14 wherein the ratio between the fourth driving pulse time period and the third driving pulse time is in the range of 16 to 1/16.

16. The field device of claim 8 wherein the coder unit is adapted to:
- code each first input bit in the input bit stream to at least one fifth driving pulse having a fifth driving pulse time period being shorter than the bit pulse time period, wherein in response to each fifth driving pulse the transmitter transmits a waveform having a first frequency;
- code each second input bit in the input bit stream to at least one sixth driving pulse having a sixth driving pulse time period being shorter than the bit pulse time period, wherein in response to the sixth driving pulse the transmitter transmits a waveform having a second frequency.

17. The field device of claim 16 wherein the ratio between the first frequency and the second frequency is in the range of 1/16 to 16.

18. The field device of claim 8 wherein the coder unit is adapted to
- code each transition from the first bit pulse amplitude to the second bit pulse amplitude in the input bit stream to at least one seventh driving pulse having a seventh driving pulse time period being shorter than the bit pulse time period, wherein in response to each seventh driving pulse the transmitter transmits a waveform having a third frequency;
- code each transition from the second bit pulse amplitude to the first bit pulse amplitude in the input bit stream to an eighth driving pulse having an eighth driving pulse time period being shorter than the bit pulse time period, wherein in response to the eighth driving pulse the transmitter transmits a waveform having a fourth frequency.

19. The field device of claim 18 wherein the ratio between the third frequency and the fourth frequency is in the range of 1/16 to 16.

20. The field device of claim 8 wherein the coder unit is adapted to:
- code each first input bit of the input bit stream into at least one ninth driving pulse for supply to the transmitter, wherein in response to the ninth driving pulse the transmitter activates a first light emitting diode at a first infrared frequency;
- code each second input bit of the input bit stream into at least one tenth driving pulse for supply to the transmitter, wherein in response to the tenth driving pulse the transmitter activates a second light emitting diode at a second infrared frequency.

21. The field device of claim 8 wherein the coder unit is adapted to:
- code each transition from the first bit pulse amplitude to the second bit pulse amplitude in the input bit stream to at least one eleventh driving pulse, wherein in response to each eleventh driving pulse the transmitter activates a third light emitting diode at a third infrared frequency;
- code each transition from the second bit pulse amplitude to the first bit pulse amplitude in the input bit stream to a twelfth driving pulse, wherein in response to the twelfth driving pulse the transmitter activates a fourth light emitting diode at a fourth infrared frequency.

22. The field device of claim 8 wherein the coder unit is adapted to execute a frame setup procedure when data is transferred according to a predetermined frame format.

23. The field device of claim 8 wherein the coder unit is adapted to execute a variable code selection.

24. The field device of claim 8 wherein the coder unit determines each driving pulse amplitude in compliance with a required data exchange distance.

25. The field device of claim 8 wherein the infrared transmitter comprises:
- a light emitting unit connected to a power supply line and to ground and emitting infrared waveforms according to driving pulses outputted by the coder unit; and
- the energy buffer is coupled across the light emitting unit for supply of energy thereto.

26. The field device of claim 25 further comprising a first resistor and a second resistor connected in series between the power supply line and the light emitting unit and that the energy buffer is connected to the node between the first resistor and the second resistor, wherein the first resistor is adapted to limit the charge current of the energy buffer.

27. The field device of claim 26 wherein the second resistor is variable to change the irradiance of the light emitting unit according to a predetermined data exchange distance.

28. The field device of claim 25 wherein the second resistor is variable to change the irradiance of the light emitting unit according to a predetermined data exchange distance.

29. The field device of claim 25 further comprising a voltage monitor to evaluate the energy stored in the energy buffer.

30. The field device of claim 7 wherein the transmitter and/or receiver comprises a decoder unit adapted to derive an output bit stream with first output bits having the bit pulse time period and the first bit pulse amplitude and second output bits having the bit pulse time period and the second bit pulse amplitude in response to output pulses of an infrared receiver.

31. The field device of claim 30 wherein the decoder unit is adapted to:
synchronize each infrared receiver output pulse to a center of the bit pulse time period;
decode the first output bit on occurrence of each infrared receiver output pulse; and to
decode the second output bit in the absence of an infrared receiver output pulse.

32. The field device of claim 30 wherein the decoder unit is adapted to
synchronize each infrared receiver output pulse to the beginning of the bit pulse time period;
decode a transition from the first bit pulse amplitude to the second bit pulse amplitude on occurrence of each first infrared receiver output pulse having a first infrared receiver output pulse time period; and to
decode a transition from the second bit pulse amplitude to the first bit pulse amplitude on occurrence of each first infrared receiver output pulse having a second infrared receiver output pulse time period.

33. The field device of claim 30 wherein the decoder unit is adapted to:
synchronize each infrared receiver output pulse to a center of the bit pulse time period;
decode the first output bit on occurrence of each infrared receiver output pulse outputted by the infrared receiver in response to a first transmission frequency; and
decode the second output bit on occurrence of each infrared receiver output pulse outputted by the infrared receiver in response to a second transmission frequency.

34. The field device of claim 30 wherein the decoder unit is adapted to:
synchronize each infrared receiver output pulse to the beginning of the bit pulse time period;
decode a transition from the first bit pulse amplitude to the second bit pulse amplitude on occurrence of each infrared receiver output pulse outputted by the infrared receiver in response to a received transmission signal having a third transmission frequency; and
decode a transition from the second bit pulse amplitude to the first bit pulse amplitude on occurrence of each infrared receiver output pulse outputted by the infrared receiver in response to transmission signal having a fourth transmission frequency.

35. The field device of claim 4 wherein the transmitter and/or receiver comprises a data display unit.

36. A manufacturing plant control system comprising:
at least one functional unit coupled to a central controller via a system bus;
at least one control bus coupling at least one field device to the functional unit;
wherein the at least one field device comprises:
a wireless transmitter and/or receiver configured for wireless data communication between the field device and a remote device when activated;
an interface coupled to the control bus, wherein the control bus supplies power and control signals to the field device through the interface, the energy being insufficient to sustain operation of the wireless transmitter and/or receiver when the wireless transmitter is activated;
an energy buffer configured to store energy from the power supplied to the field device via the interface, and to supply the stored energy to the wireless transmitter and/or receiver during wireless data communication to sustain operation of the wireless transmitter and/or receiver;
at least one actuator or sensor adapted to alter or sense a control or process variable in a manufacturing field; and
a controller configured to evaluate an amount of the stored energy available in the energy buffer prior to activation of the transmitter and/or receiver and, when the evaluation indicates that the stored energy in the energy buffer is insufficient to sustain operation of the wireless transmitter and/or receiver during wireless data communication, delay activation of the wireless transmitter and/or receiver until the amount of stored energy in the energy buffer is sufficient to sustain operation of the wireless transmitter and/or receiver during wireless data communication.

37. The manufacturing plant control system of claim 36 wherein the at least one field device comprising the transmitter and/or receiver is adapted for wireless remote access to field devices coupled to the at least one control bus.

38. The manufacturing plant control system of claim 37 wherein the at least one functional unit comprises a further transmitter and/or receiver for wireless data exchange with the at least one field device.

39. The manufacturing plant control system of claim 37 wherein the at least one functional unit comprises a further transmitter and/or receiver for wireless remote access to field devices coupled to the functional unit via a control bus.

40. The manufacturing plant control system of claim 37 wherein at least two field devices are provided with an transmitter and/or receiver for wireless data communication and that the field devices are coupled by a remote access data exchange network.

41. The manufacturing plant control system of claim 36 wherein the at least one functional unit comprises a further transmitter and/or receiver for wireless data exchange with the at least one field device.

42. The manufacturing plant control system of claim 41 wherein the at least one functional unit comprises a further transmitter and/or receiver for wireless remote access to field devices coupled to the functional unit via a control bus.

43. The manufacturing plant control system of claim 41 wherein at least two field devices are provided with an transmitter and/or receiver for wireless data communication and that the field devices are coupled by a remote access data exchange network.

44. The manufacturing plant control system of claim 36 wherein the at least one functional unit comprises a further transmitter and/or receiver for wireless remote access to field devices coupled to the functional unit via a control bus.

45. The manufacturing plant control system of claim 44, wherein at least two field devices are provided with an transmitter and/or receiver for wireless data communication and that the field devices are coupled by a remote access data exchange network.

46. The manufacturing plant control system of claim 36 wherein at least two field devices are provided with an transmitter and/or receiver for wireless data communication and that the field devices are coupled by a remote access data exchange network.

47. A method of exchanging data in a manufacturing plant control systems using wireless data communication, the method comprising:
- receiving, at a field device, power from a control bus, wherein the field device includes a wireless transmitter and/or receiver configured for wireless data communication between the field device and a remote device when activated and the power is insufficient to sustain operation of the wireless transmitter and/or receiver when the wireless transmitter is activated;
- storing energy from the power received at the field device from the control bus;
- supplying the stored energy to the wireless transmitter and/or receiver during wireless data communication to sustain operation of the wireless transmitter and/or receiver;
- evaluating an amount of the stored energy prior to activation of the transmitter and/or receiver for wireless data communication; and
- when the evaluation indicates that the stored energy is insufficient to sustain operation of the wireless transmitter and/or receiver during wireless data communication, delay activation of the wireless transmitter and/or receiver until the amount of stored energy is sufficient to sustain operation of the wireless transmitter and/or receiver during wireless data communication.

48. The method of claim 47 further including segmenting an input data stream into data segments for subsequent wireless data transmission.

49. The method of claim 48 wherein evaluating the amount of the stored energy prior to activation of the transmitter and/or receiver for wireless data communication comprises evaluating the amount of the stored energy prior to activation of the transmitter and/or receiver for transmission of each data segment.

50. The method of claim 49 further comprising transmitting a related message to the transmitter to interrupt wireless data transmission until further energy is supplied to the field device when the evaluation indicates that the stored energy is insufficient to sustain operation of the wireless transmitter and/or receiver during wireless data communication.

51. The method of claim 48 wherein further comprising transmitting a related message to the transmitter to interrupt wireless data transmission until further energy is supplied to the field device when the evaluation indicates that the stored energy is insufficient to sustain operation of the wireless transmitter and/or receiver during wireless data communication.

52. The method of claim 47 further comprising transmitting a related message to the transmitter to interrupt wireless data transmission until further energy is supplied to the field device when the evaluation indicates that the stored energy is insufficient to sustain operation of the wireless transmitter and/or receiver during wireless data communication.

53. A computer-useable storage medium storing a program that is loadable into a memory of a field device that includes a wireless transmitter and/or receiver configured for wireless data communication between the field device and a remote device when activated, the program including software code for exchanging data in a manufacturing plant control system using wireless data communication by causing a controller of the field device to:
- receive power from a control bus, the power being insufficient to sustain operation of the wireless transmitter and/or receiver when the wireless transmitter and/or receiver is activated;
- supply the stored energy to the wireless transmitter and/or receiver during wireless data communication to sustain operation of the wireless transmitter and/or receiver;
- evaluate an amount of the stored energy prior to activation of the transmitter and/or receiver for wireless data communication; and
- when the evaluation indicates that the stored energy is insufficient to sustain operation of the wireless transmitter and/or receiver during wireless data communication, delay activation of the wireless transmitter and/or receiver until the when the evaluation indicates that the stored energy is insufficient to sustain operation of the wireless transmitter and/or receiver during wireless data communication, delaying activation of the wireless transmitter and/or receiver until the amount of stored energy is sufficient to sustain operation of the wireless transmitter and/or receiver during wireless data communication.

* * * * *